(12) United States Patent
Woods

(10) Patent No.: US 10,116,914 B2
(45) Date of Patent: Oct. 30, 2018

(54) STEREOSCOPIC DISPLAY

(71) Applicant: 3DI LLC, Alexandria, VA (US)

(72) Inventor: David Woods, Burke, VA (US)

(73) Assignee: 3DI LLC, Burke, VA (US)

(*) Notice: Subject to any disclaimer, the term of this patent is extended or adjusted under 35 U.S.C. 154(b) by 82 days.

(21) Appl. No.: 14/106,766

(22) Filed: Dec. 15, 2013

(65) Prior Publication Data

US 2015/0124063 A1 May 7, 2015

Related U.S. Application Data

(60) Provisional application No. 61/897,983, filed on Oct. 31, 2013, provisional application No. 61/900,982, filed on Nov. 6, 2013.

(51) Int. Cl.
| | | |
|---|---|---|
| *H04N 13/00* | (2018.01) |
| *H04N 13/117* | (2018.01) |
| *H04N 13/341* | (2018.01) |
| *H04N 13/378* | (2018.01) |
| *H04N 13/376* | (2018.01) |

(52) U.S. Cl.
CPC ......... *H04N 13/117* (2018.05); *H04N 13/341* (2018.05); *H04N 13/376* (2018.05); *H04N 13/378* (2018.05)

(58) Field of Classification Search
CPC ..................... H04N 13/117; H04N 13/376
USPC .......................................................... 348/56
See application file for complete search history.

(56) References Cited

U.S. PATENT DOCUMENTS

| | | | | |
|---|---|---|---|---|
| 6,064,354 A | * | 5/2000 | DeLuca | G02B 27/22 |
| | | | | 345/419 |
| 6,084,979 A | | 7/2000 | Kanade et al. | |
| 8,717,423 B2 | | 5/2014 | Vesely et al. | |
| 8,970,625 B2 | | 3/2015 | Chavez et al. | |
| 9,106,903 B2 | | 8/2015 | Tu et al. | |
| 2008/0297593 A1 | * | 12/2008 | Debevec | G02B 27/225 |
| | | | | 348/51 |
| 2009/0262074 A1 | * | 10/2009 | Nasiri | A63F 13/06 |
| | | | | 345/158 |

(Continued)

*Primary Examiner* — Jeffery Williams
(74) *Attorney, Agent, or Firm* — Arc IP Law, PC; Joseph J. Mayo

(57) ABSTRACT

A stereoscopic display system includes an image display panel, viewpoint position sensors, and a means to create first or left and second or right stereoscopic images corrected for parallax. This allows for multiple viewpoints to perceive the viewed 3D stereoscopic image as approximately fixed in space. In one embodiment, the first and second images may be perceived as a 3D stereoscopic image by applying shutter glasses. In another embodiment, the first and second images may be perceived as a 3D auto stereoscopic image by applying configurable louvers or light guiding layers. In this embodiment, the display system utilizes information from the position sensors to optimize electronically configurable louvers. This allows for large displays to be seen from multiple viewpoints.
The virtual 3D stereoscopic object images, being virtually fixed in space may be interacted with by the user or users in much the same way 2D objects are manipulated by applying a touch screen. This allows for input systems such as virtual keyboards and remote controllers. The methods described may be applied in other ways, including, but not limited to gaming systems, 3D virtual caves, and simulators.

1 Claim, 36 Drawing Sheets

(56) References Cited

U.S. PATENT DOCUMENTS

| | | | |
|---|---|---|---|
| 2009/0278936 A1* | 11/2009 | Pastoor | G09G 3/003 348/169 |
| 2010/0007582 A1* | 1/2010 | Zalewski | A63F 13/00 345/8 |
| 2010/0074594 A1* | 3/2010 | Nakamura | H04N 13/007 386/241 |
| 2010/0103516 A1* | 4/2010 | McKnight | A63F 13/06 359/465 |
| 2010/0134411 A1* | 6/2010 | Tsumura | G06F 3/0304 345/156 |
| 2011/0128555 A1* | 6/2011 | Rotschild | G02B 27/2271 356/625 |
| 2011/0157264 A1* | 6/2011 | Seshadri | G06F 3/14 345/698 |
| 2011/0181706 A1* | 7/2011 | Harrold | G02B 27/225 348/51 |
| 2011/0221871 A1* | 9/2011 | Sakaniwa | H04N 13/0029 348/51 |
| 2011/0316881 A1* | 12/2011 | Yoshifuji | H04N 13/0409 345/634 |
| 2012/0120060 A1* | 5/2012 | Noda | G06F 3/017 345/419 |
| 2012/0182407 A1* | 7/2012 | Yoshida | G02B 27/2214 348/54 |
| 2012/0229431 A1* | 9/2012 | Hiroki | G09G 3/003 345/204 |
| 2013/0069933 A1* | 3/2013 | Smithwick | G02B 27/2214 345/419 |
| 2013/0258129 A1 | 3/2013 | Burns | |
| 2013/0187961 A1 | 7/2013 | Hunt | |
| 2013/0201293 A1 | 8/2013 | Konno et al. | |
| 2013/0222394 A1 | 8/2013 | Fyke | |
| 2014/0184496 A1* | 7/2014 | Gribetz | G02B 27/017 345/156 |
| 2015/0020031 A1* | 1/2015 | El Dokor | G06F 3/011 715/849 |
| 2015/0143976 A1* | 5/2015 | Katto | A63F 13/211 84/602 |

* cited by examiner

STEREOSCOPIC DISPLAY

CROSS REFERENCE TO PRIORITY APPLICATION

This application claims the priority benefit of U.S. Provisional Patent Application Ser. No. U.S. 61/897,983, filed on Oct. 31, 2013 and Ser. No. U.S. 61/900,982, filed on Nov. 6, 2013, the subject matter for which is incorporated herein by reference.

BACKGROUND OF THE INVENTION

1. Field of the Invention

The present invention relates to a stereo image display technique, by which a 3D image display may produce a stereoscopic image which takes viewpoint into account. By taking viewpoint into account a stereoscopic image may be created which appears to remain at approximately the same location in space as viewpoint changes.

2. Description of Related Art

Methods of implementing a 3D stereoscopic image are described as follows:

First of all, as mentioned in the following description, in order to implement a 3D stereoscopic image, a first image for a left eye and a second image for a right eye need to arrive at both eyes in a manner of being discriminated from each other. For this, various methods are explained as follows. These images shall be referred to as first or left image and second or right image.

Prior art displays which may be viewed as 3D images generally fall into four methods for display of 3D imagery.

The first method employs polarized light images where the planes for left and right images are rotated by approximately 90 degrees. These polarized left and right images pass through polarized spectacles so that the corresponding image reaches the left and right eye. A viewer who tilted their head would degrade the 3D stereoscopic image.

Another similar method employs liquid crystal shutter spectacles which open and close left and right shutters so as to allow the corresponding image to reach the correct eye. Prior art employing liquid crystal shutters do not account for a change in viewing location from one viewer to the next. Therefore a 3D image would appear to be at different locations in space when viewed from differing viewpoints. Thus if one viewer pointed at a 3D stereoscopic object, a viewer at a second viewing location would have difficulty determining what is being pointed at.

A third method employs a lenticular screen provided between a display and both eyes. In particular, a propagating direction of light is refracted via lens on the lenticular screen, whereby different images arrive at both eyes, respectively.

A fourth method requires no spectacles and utilizes parallax barriers so that only the proper image is seen by each eye. This technology shall be referred to as auto stereoscopic.

Prior art applying this method required that the viewer remain in an optimal location for 3D viewing. Other spectators may not be able to see 3D imagery clearly. When it does account for tilting of the head or differing viewpoints it is limited to only one viewer. It is not possible for a second viewer to obtain a 3D image as well unless the second viewpoint is closely aligned with the first viewpoint. This limits prior 3D auto stereoscopic to smaller devices of the handheld variety. This technology is also unable to provide for a second viewer to determine which 3D stereoscopic object is being pointed at by a first viewer.

In one embodiment of the present invention parallax barriers at different locations of the display may have different pitch angles in relation to the display surface at the same time. The parallax barriers shall also be referred to as electronically configurable light guiding louvers, or louvers.

By varying the pitch angle of the louvers in relation to viewpoint for multiple locations of the display, a larger display may be viewed auto stereoscopically. Thus for a viewpoint centered in front of the display louvers on opposite sides of the display would guide the light from the display at angles of slightly differing directions. In this way light from each location of the display is guided towards the intended viewpoint.

In addition another embodiment of the present invention may apply these electronically configurable light guiding louvers in more than one axis concurrently. Thus when one viewer tilts his head the light passing through the louvers is guided to the intended viewing location and is blocked or shielded from other viewing locations.

In addition, prior art employing parallax barriers does not account for a change in viewing location from one viewer to the next. Therefore a 3D image would appear to be at different locations in space when viewed from differing viewpoints. Thus if one viewer pointed at a 3D stereoscopic object, a viewer at a second viewing location would have difficulty determining what is being pointed at. Thus the prior art is limited in interaction with the viewer(s).

SUMMARY OF THE INVENTION

The present invention employs a 3D stereoscopic method combined with position sensing technology to produce a 3D stereoscopic image which remains in approximately the same location in space even when viewed from various perspectives. This provides a 3D image which appears to be in approximately the same location despite the viewing location. The viewer may move towards or away, up or down, left or right yet the image remains in approximately the same location in space. It moves very little as the viewpoint changes. However, the 3D stereoscopic image will change to reflect how the viewer would see the 3D objects in the image from different perspectives. This 3D stereoscopic image which remains approximately fixed in spatial location may also be referred to as a virtually real image, virtual real image or virtual image.

In prior art two or possibly more viewers would see the 3D image appearing in front of them and if they tried to touch a 3D object they would reach for different places (most likely in front of each viewer). Prior art 3D stereoscopic images move with the viewer and an object directly in front of the viewer remains directly in front as the viewer moves up and down, or left and right, towards or away.

The present invention allows two or more viewers to see 3D stereoscopic object images in the same location in space. The objects in the 3D stereoscopic image may be referred to as being stabilized in space, having spatial stabilization, or stabilized. With the present invention if more than one viewer reached for a 3D stereoscopic image object they would likely touch hands.

In addition, the sensors on the display in combination with a computing device may detect when an external object or pointer is in close proximity to the virtual location of a 3D stereographic object whose position is stabilized in space. Thus stabilized, it becomes possible for one or more viewers to interact with the 3D stereoscopic image.

To accomplish this goal, the perspective position of the viewpoint must be sensed and measured. From this information an image is created which is what an observer located at this position would see if the real object were present. This viewpoint is what one would expect to see if viewed in a monocular fashion (i.e. from one eye with the other closed). Therefore, for each viewing location (or eye location) a new image must be created. So the sensor must be able to calculate the position of each eye or lens of the viewer(s). The created images must take into account both the angular position of the viewpoint and the distance. The viewing angle and distance will be referred to as viewing perspective, or viewpoint. In addition where louvers are used, the viewing perspective may take the pairing of eyes into account in order to compute the optimal light guiding direction the louvers. This will be further illustrated in the detailed description.

In the present invention the viewer is able to interact with the stabilized virtual image. This enables many applications. Input devices such as keyboards, remote controllers, musical instruments, virtual caves, virtual simulators and interactive 3D gaming systems are a few such applications, however the present invention is not meant to be limited to these systems or devices. Some of these systems or devices will be further described in the following detailed description.

Prior art in which images are created based on viewpoint perspective in real time 2D displays are common. Many video games at this time employ said technology. The image may be completely computer generated or interpolated from photographic images taken from various perspectives. This same technology may be adapted to create stereographic pairs of images, which when viewed by the stereographic methods of the present invention may produce the desired stabilized 3D image.

In addition, current motion picture creation employs sensors which track location of body parts which are then used to create images. Such sensing technology could be used to track the eyes or lenses of glasses. Some location sensing methods employ small round objects which emit light, other methods do not. These sensors may also be used to track the location of pointers, or body parts. They may also be used to track wearable devices to include, but not be limited to gloves, glasses, and hats. Wearable devices may include objects with tracking devices, which may emit or reflect light to the sensors. The emitted or reflected light may be coded by pulses, frequency or other method to enable sensors to differentiate location.

Finally, the correct image must reach the correct lens or eye. One of two methods is used to achieve this.

In the first embodiment shutter glasses are employed.

In a second embodiment one or more layers of electronically configurable barriers or louvers are employed. Current technology in this area employs fixed orientation louvers. However an improved louver would be able to rotate as the viewer rotates their head. In addition the louvers may employ variable degree of tilt (i.e. a louver at the edge of the display may employ a different tilt from one more towards the center so both aim light towards the viewing location).

Another improved louver technique is the use of louvers which guide light, or block light, in more than one axis concurrently. This produces a straw like tube of light from which pixels of light are guided to the intended lens or eye. The cross sectional area of the straw like tube of light may be circular, rectangular or of another shape. These louvers may be of varying pitch in both horizontal and vertical directions. This will be illustrated in greater detail in the detailed description. Another way of stating this is these louvers may vary their pitch one or more axial directions. This allows a larger screen to be used than is possible with louvers which remain fixed in pitch. By pitch of the louvers, is meant the angle which the light guided through (or alternately blocked by) the louvers makes with the display surface.

As the number of viewers increase, whether employing either the shutter method or the louvers, the amount of light to each viewers decreases proportionally. Therefore the number of viewers may be manually limited in the present invention. The limitations placed on viewers may include, but not be limited to number of viewers, time lapse from sensing to adding another viewer, allowed time with head turned from the display, etc. In addition the brightness of the display may be made to automatically brighten or darken depending on number of viewers and lighting conditions in the room.

This invention may also display 3D stereographic images in the manner of prior art whereby the first and second image do not use information from the sensors to vary the image based on viewpoint location. This method shall be referred to as prior art 3D. This method may be employed for viewing medium such as movies or games which have been created for prior art 3D.

Furthermore, this invention enables switching between 2D and 3D modes. In 2D mode multiple viewers may view multiple images. So the display may be used to watch different things by two or more viewers.

Also, the display of this invention may be presented in portrait or landscape mode. The landscape or portrait mode may be manually or automatically changed by means of an orientation sensor of various types. So a tablet, phone, or other handheld device may use the display of this invention.

The horizontal and vertical louvers of one embodiment, which will be described in greater detail in the description, allow a privacy mode to be created. In such a mode a single viewer would be recognized by the invention through either facial recognition software, eye pattern sensing, or other means. Once placed in privacy mode, the dual louvers would be arranged so as to guide image light only to the desired viewer's eyes.

To sum up the process, method, or system, of creating and viewing the virtual image is as follows:

1. A left or first viewing perspective is sensed and location quantified in space.
2. A left or first image is created corresponding to what would be seen by a viewer with said left or first perspective.
3. The left or first image is displayed in conjunction with technology which limits the viewing to the left or first perspective. This may be accomplished via shutter glasses or electronically configurable louver patterns.
4. A right or second viewing perspective is sensed and location quantified in space.
5. A right or second image is created corresponding to what would be seen by a viewer with said right or second perspective.
6. The right or second image is displayed in conjunction with technology which limits the viewing to the right or second perspective. This may be accomplished via shutter glasses or electronically configurable louver patterns.
7. The process is repeated for each viewer in sequence in a continuous loop. However, the sequence may vary in order so long as the image is coordinated with the stereoscopic method so that the correct image reaches the intended eye.

In this manner a 3D stereoscopic image may be seen whose location remains approximately fixed in space when viewed from different perspectives.

There are many ways of accomplishing this end. There are endless variations of placement of parts, methods of generating image patterns, louver patterns, coordination of images with louvers or shutter glasses, different ordering of parts, and/or display images which accomplish the same objective. Someone practiced in the art will be able to design and construct many variations, which include but are limited to those above. Hence the invention is what is in the claims and includes more than the embodiments described below.

DETAILED DESCRIPTION OF THE INVENTION

Figure 1:
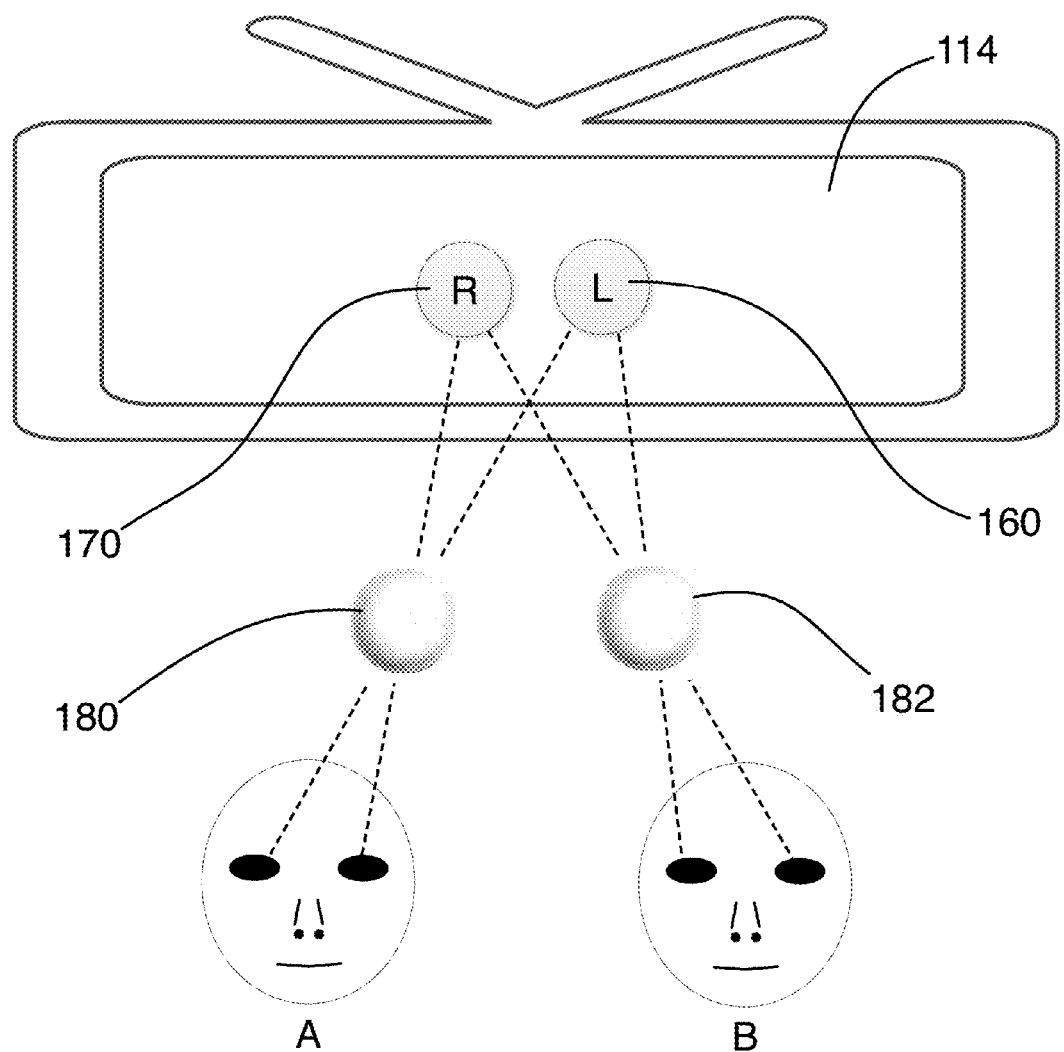
FIG. 1 is a schematic diagram illustrating prior art in which the 3D stereoscopic images virtual location moves as viewpoint shifts.

With reference now to FIG. 1 of the drawings, there is shown an illustration of prior art. A 3D stereoscopic image is presented to viewers positioned at A and B. The left or first image (item 160) as well as the right or second image (item 170) locations is fixed on the image display (item 114) for either viewing from position A or B. The result is 3D image object locations 180 and 182 which differ in space. Each tends to be more in front of the viewing position.

Figure 2:
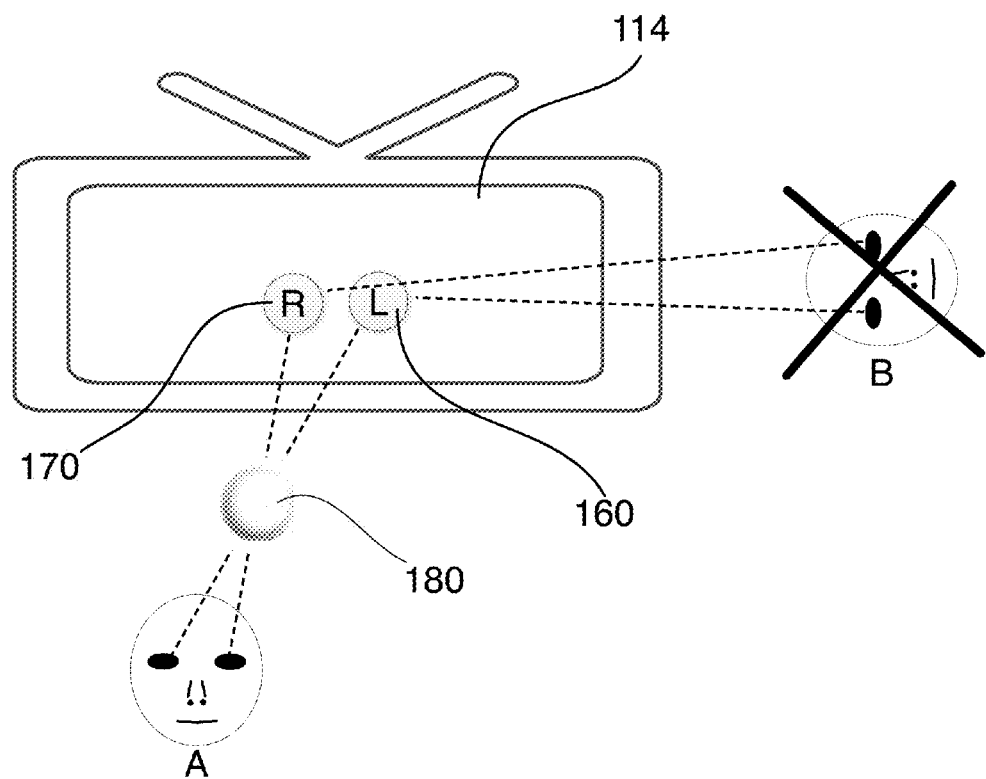
FIG. 2 is a schematic diagram illustrating prior art in which the 3D virtual image is unable to be viewed stereoscopically when the viewers head is angularly tilted in relation to the display.

With reference now to FIG. 2 of the drawings, there is shown an illustration of prior art. It is apparent that changing viewing angle results in less than optimal 3D image or possibly failure of 3D imaging.

Figure 3:
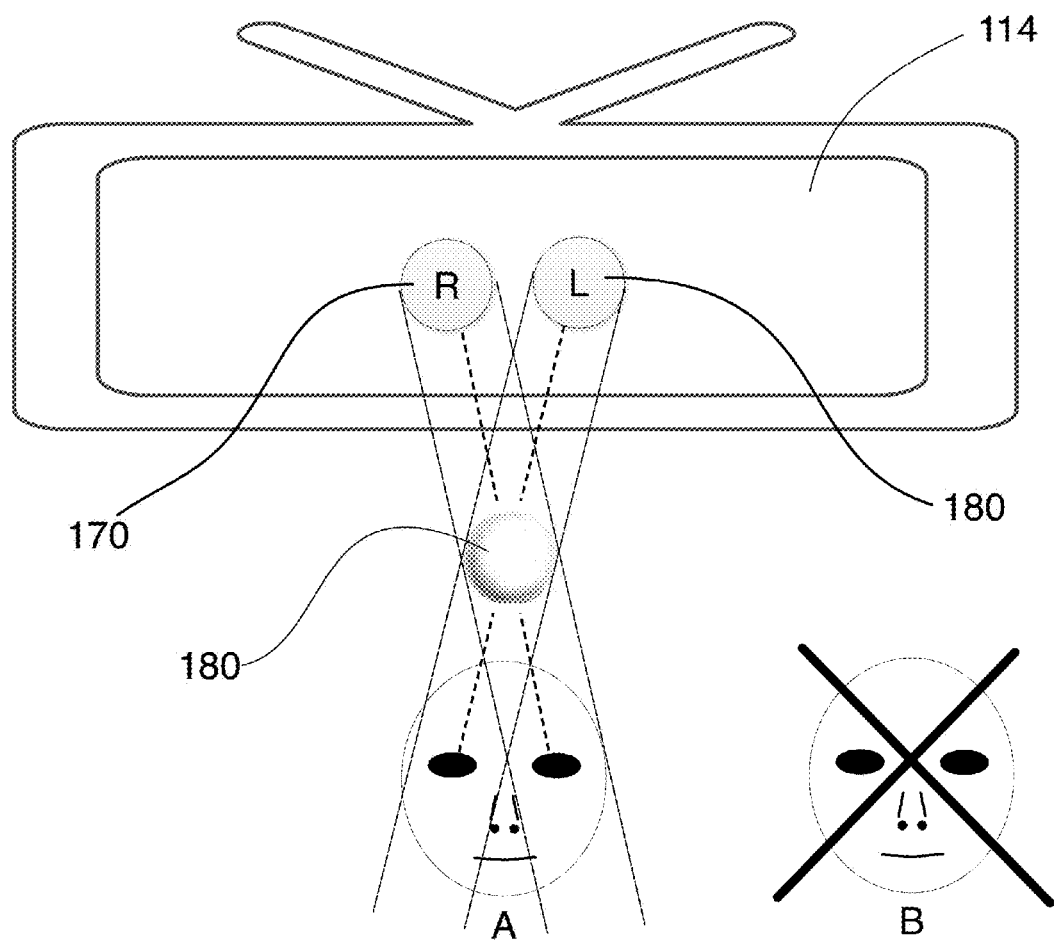
FIG. 3 is a schematic diagram illustrating prior art 3D auto stereoscopic displays which limit viewing location.

With reference now to FIG. 3 of the drawings, there is shown an illustration of prior art, a 3D stereoscopic device which employs current louvers to aim or guide the light from an image to the viewer's eyes. The limitation is because the louvers are fixed and not configurable based on viewing location. Therefore the viewing location is limited.

Figure 4:
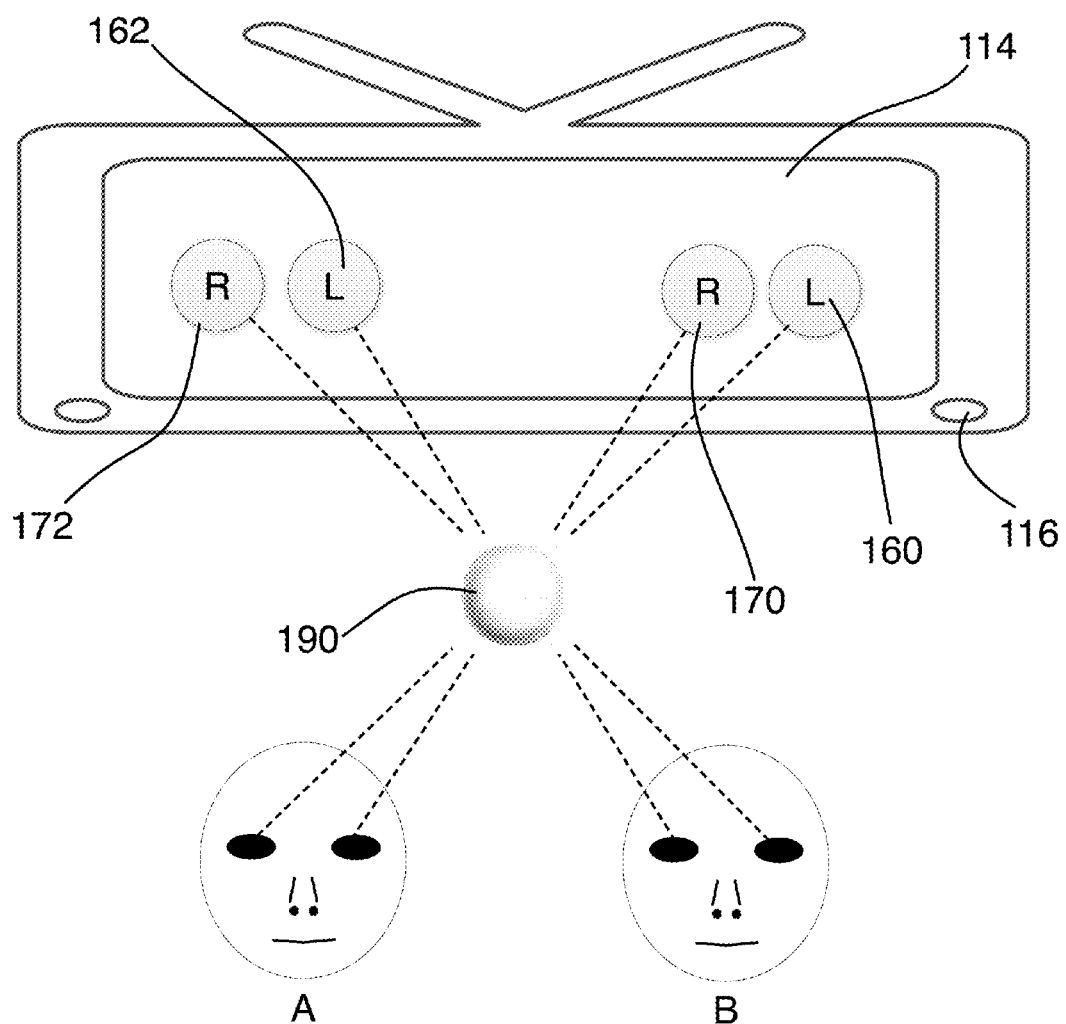
FIG. 4 is a schematic diagram illustrating an embodiment where the 3D stereoscopic image remains fixed in space as viewing location is shifted.

With reference now to FIG. 4 of the drawings, there is shown an illustration of an embodiment of the present invention. Sensors (item 116) locate the viewpoint perspectives. These sensors may be passive receivers, or may be emissive and receptive of signals, or of other methods to determine viewpoint locations. Based on where the viewpoint perspective is sensed, an image is created corresponding to how the intended image would be seen from that viewpoint.

For a viewer located at A, the first or left displayed image (item 160) is now a function of viewer perspective A. The second or right displayed image (item 170) is also now a function of viewer perspective A.

For a viewer located at B, the first or left displayed image (item 162) is now a function of viewer perspective B. The second or right displayed image (item 172) is also now a function of viewer perspective B. As a result, the 3D stereoscopic object image (item 190) is now seen in approximately the same location in space from both viewpoints A and B.

Due to the 3D stereoscopic images location being approximately fixed in space its position in relation to the display may be determined. This may then be compared with the sensed location of a viewer's body part, wearable object, or pointer. In this manner it will be possible for one or more users to interact with the 3D stereographic objects or images.

Figure 5:
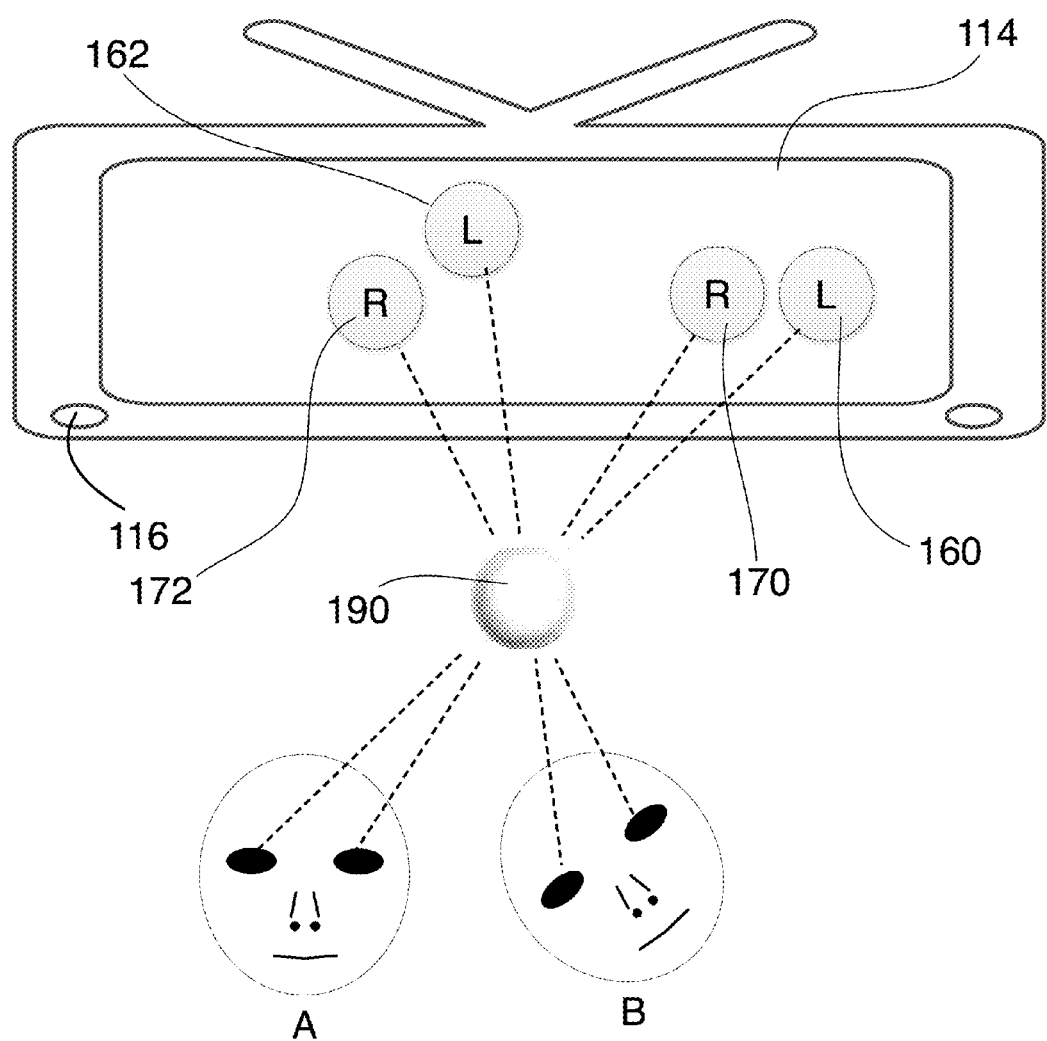
FIG. 5 is a schematic diagram illustrating an embodiment where the 3D stereoscopic image remains fixed and viewable as the viewers head is angularly tilted in relation to the display.

With reference now to FIG. 5 of the drawings, there is shown an illustration of an embodiment of the present invention. Sensors (item 116) locate the viewpoint perspectives. These sensors may be passive receivers, or may be emissive and receptive of signals, or of other methods to determine viewpoint locations. Based on where the viewpoint perspective is sensed, an image is created corresponding to how the intended image would be seen from that viewpoint.

For a viewer located at A, the first or left displayed image (item 160) is now a function of viewer perspective A. The second or right displayed image (item 170) is also now a function of viewer perspective A.

In this illustration, the viewer located at B has his head tilted in relation to the display (item 114). For the viewer located at B, the first or left displayed image (item 162) is a function of viewer perspective B. The second or right displayed image (item 172) is also a function of viewer perspective B. As a result, the 3D stereoscopic object image (item 190) is now seen in approximately the same location in space from both viewpoints A and B. Viewer B is able to see the 3D stereoscopic image in approximately the same location in space as viewer A sees the 3D stereoscopic image, even though his head is tilted with respect to the display. Prior art is unable to produce this result.

Due to the 3D stereoscopic images location being approximately fixed in space its position in relation to the display may be determined. This may then be compared with the sensed location of a viewer's body part, wearable object, or pointer. In this manner it will be possible for one or more users to interact with the 3D stereographic objects or images when one or more user's viewpoint is tilted in relation to the display.

Figure 6:
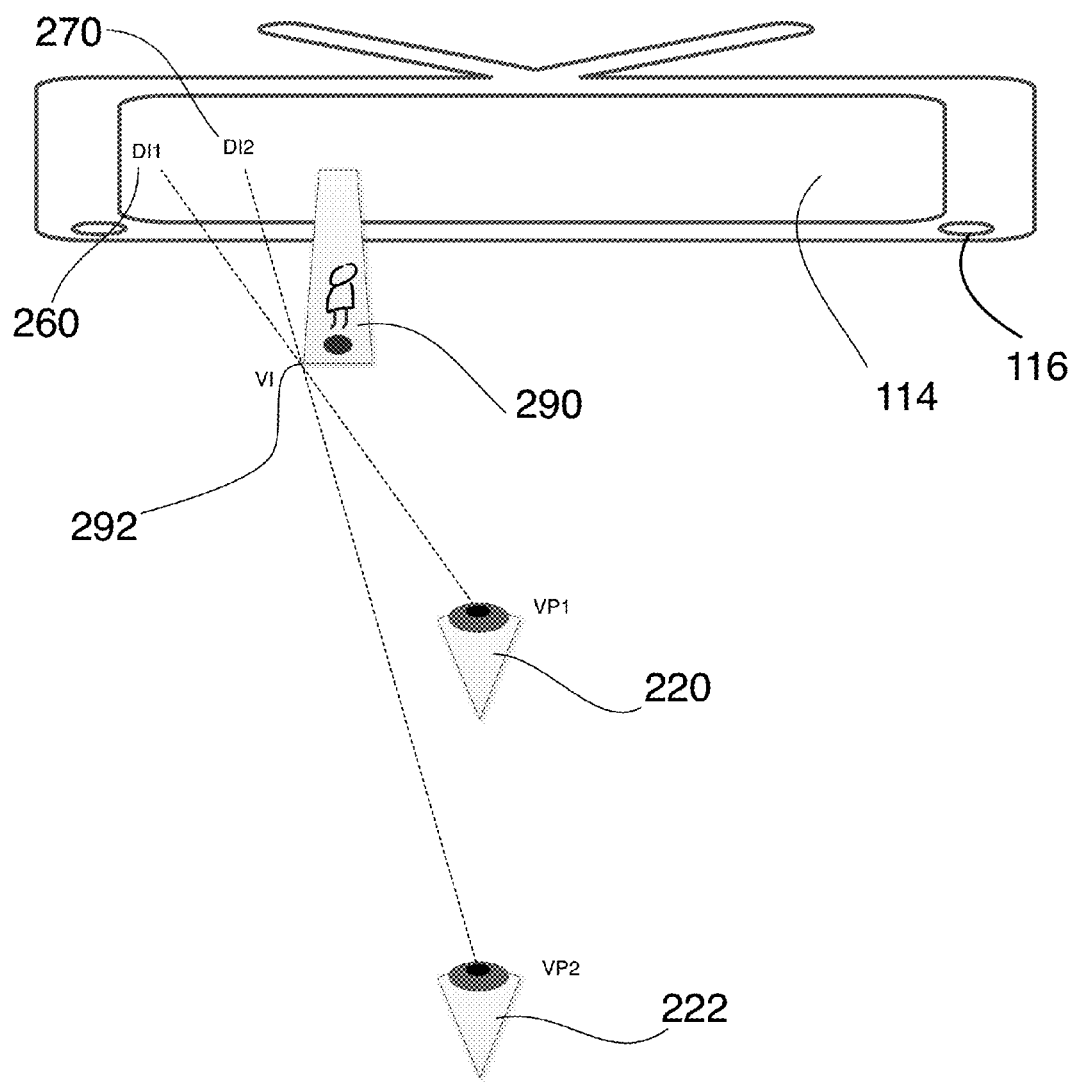
FIG. 6 is a schematic diagram illustrating an embodiment where the 3D stereoscopic image remains fixed in space as the viewing location is moved closer or farther from the display.

With reference now to FIG. 6 of the drawings, there is shown an illustration of an embodiment of the present invention. This illustrates the fact that in addition to viewing angle, the viewing distance also is measured in order to create the correct display image presentations (items 260 and 270). In this manner both viewpoint 1 (item 220) and 2 (item 222) are able to see the virtual object image (item 292) in approximately the same location in space. Sensors (item 116) locate the viewpoint perspectives. These sensors may be passive receivers, or may be emissive and receptive of signals, or of other methods to determine viewpoint locations. Based on where the viewpoint perspective is sensed, an image is created corresponding to how the intended image would be seen from that viewpoint.

Figure 7:
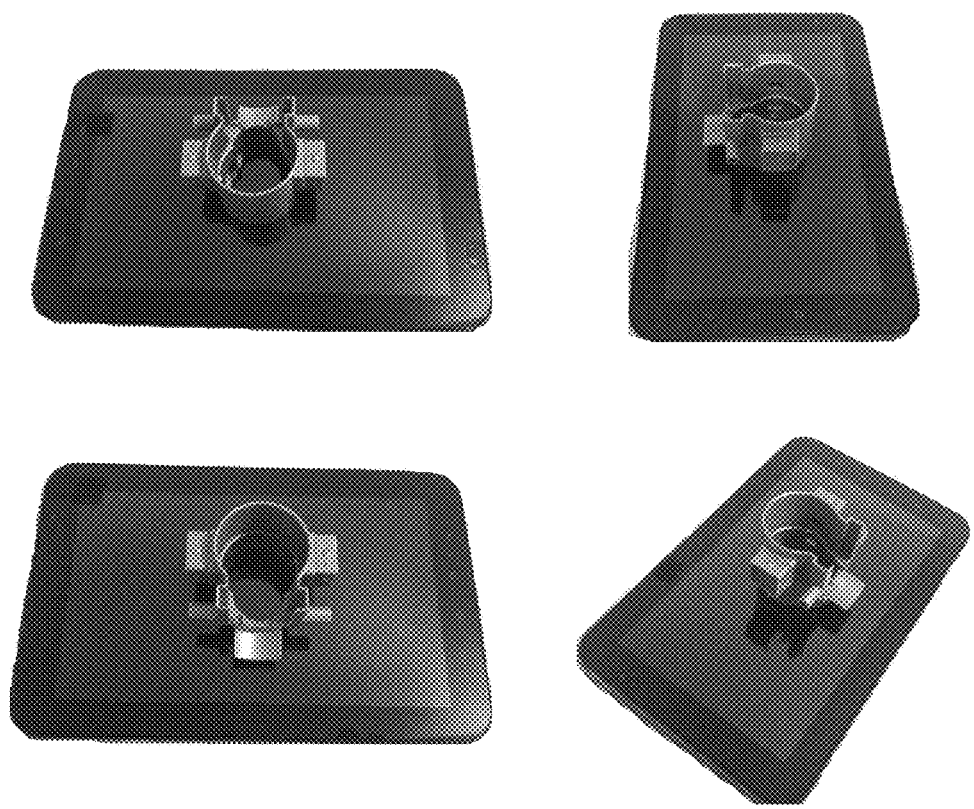
FIG. 7 is a schematic diagram illustrating an embodiment where the 3D virtual object is seen from different viewpoints yet remains fixed in space.

With reference now to FIG. 7 of the drawings, there is shown an illustration of an embodiment of the how an object might appear when viewed from different perspectives in the present invention.

Figure 8:
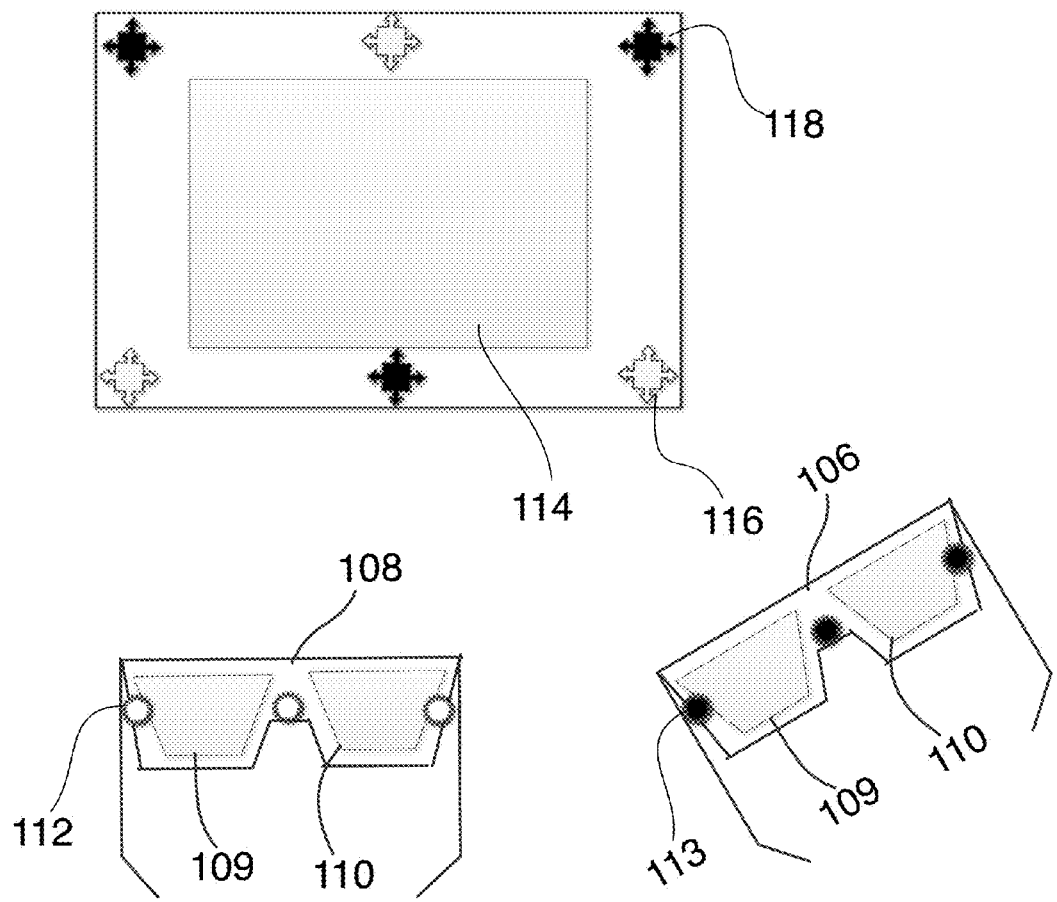
FIG. 8 is a schematic diagram illustrating an embodiment applying viewpoint sensors and shutter glasses.

With reference now to FIG. 8 of the drawings, there is shown an illustration of an embodiment of the present invention. One or more sets of sensors (items 116 and 118) may be used to sense the location of glasses (items 106 and 108) and specifically the lenses (items 109 and 110) of the glasses using position markers (items 112 and 113) located on the glasses. These markers may emit or reflect light which is sensed by the sensors, or be of another technology. Another refinement would be such a system without need for markers to locate viewing perspectives as for example facial recognition technology.

Figure 9:
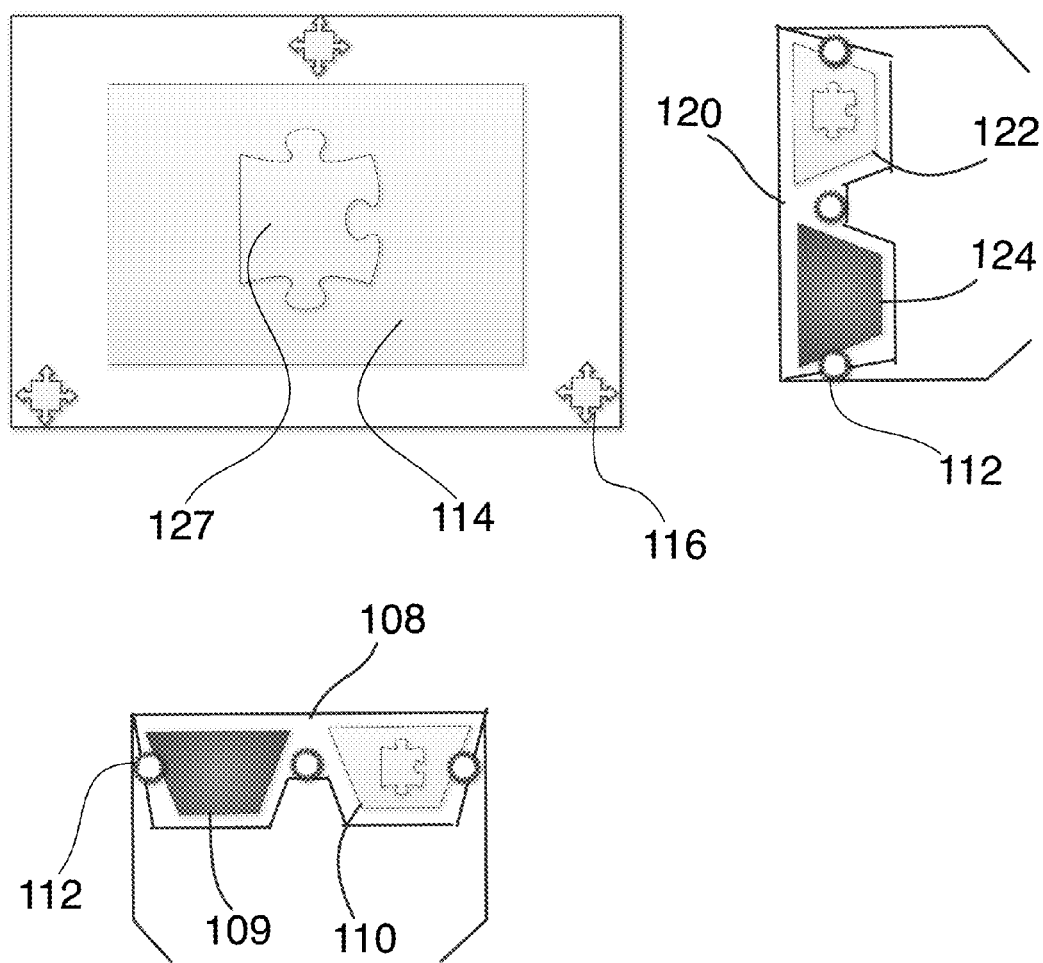
FIG. 9 is a schematic diagram illustrating an embodiment applying viewpoint sensors and shutter glasses.

With reference now to FIG. 9 of the drawings, there is shown an illustration of an embodiment of the present invention applying shutter glasses. One or more sets of sensors (item 116) may be used to sense the location of shutter glasses (items 108 and 120) and specifically the lenses (items 109, 110, 122, and 124) of the shutter glasses using position markers (items 112 and 113) located on the shutter glasses. An object image (item 127) would be presented as different images to perspective viewing locations represented by the open shutter lenses (items 110 and 122) of items 108 and 120.

Figure 10:
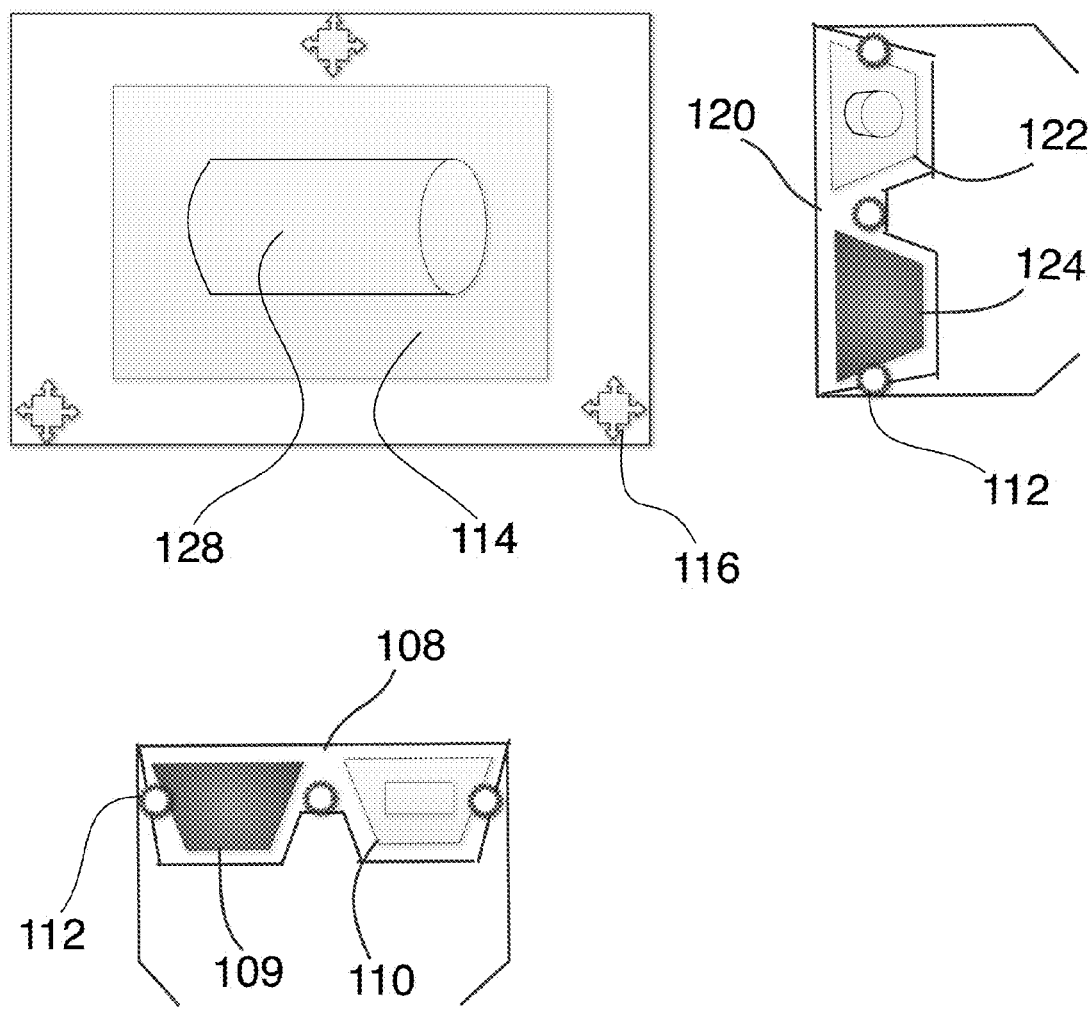
FIG. 10 is a schematic diagram illustrating an embodiment applying viewpoint sensors and shutter glasses.

With reference now to FIG. 10 of the drawings, there is shown an illustration of an embodiment of the present invention. An object image (item 128), in this case a cylinder, would be presented as different images to perspective viewing locations represented by items 108 and 120.

Figure 11:
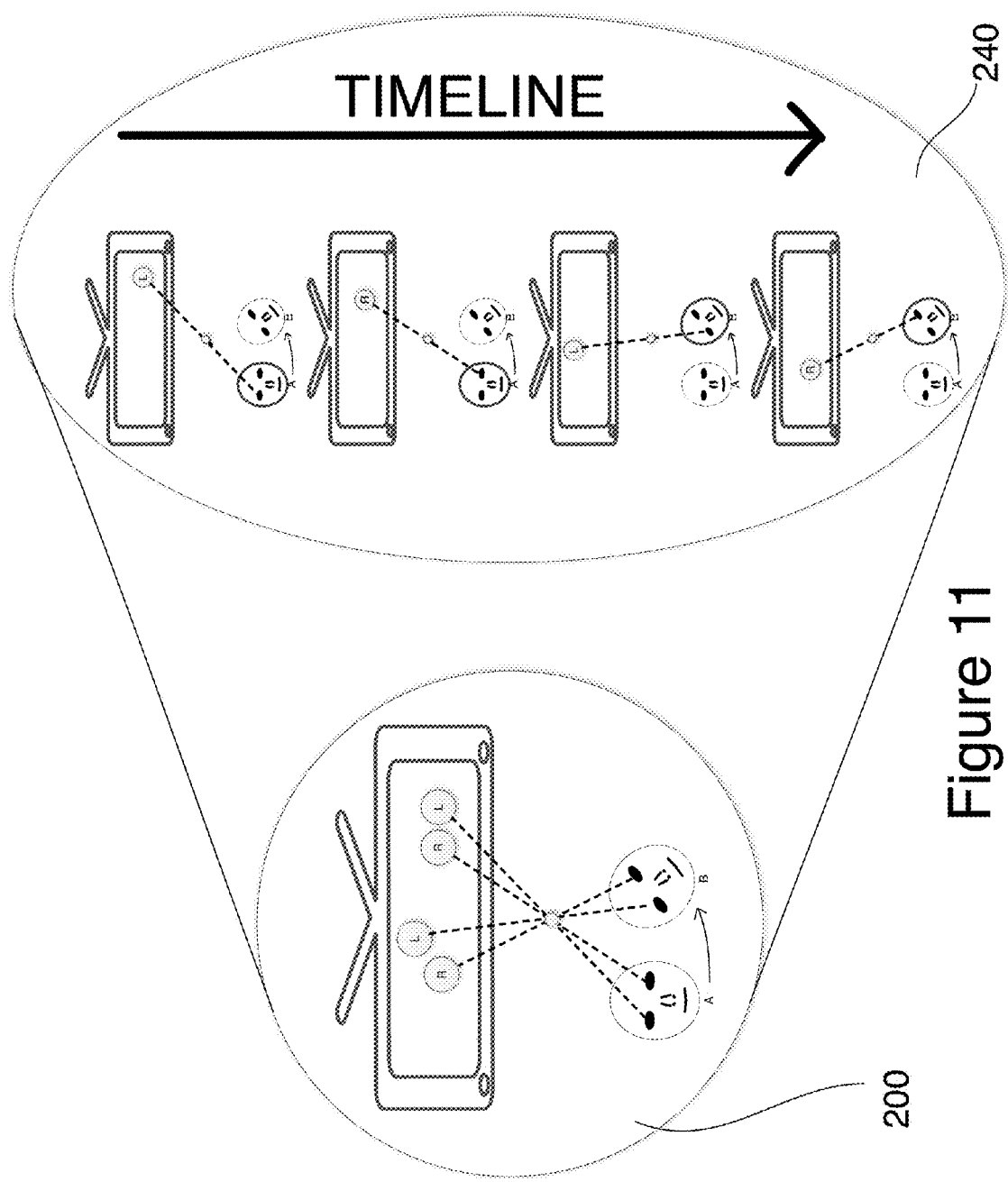
FIG. 11 is a schematic diagram illustrating an embodiment where images may be displayed as time progresses.

With reference now to FIG. 11 of the drawings, there is shown an illustration of an embodiment of the present invention. This illustration shows progression through time. Item 200 shows how as viewing location is changed, the 3D stereoscopic images location remains unchanged in space. Item 240 shows how this is accomplished by enabling each prospective viewpoint to see an image created based on the viewpoints perspective as viewing location differs.

Figure 12:
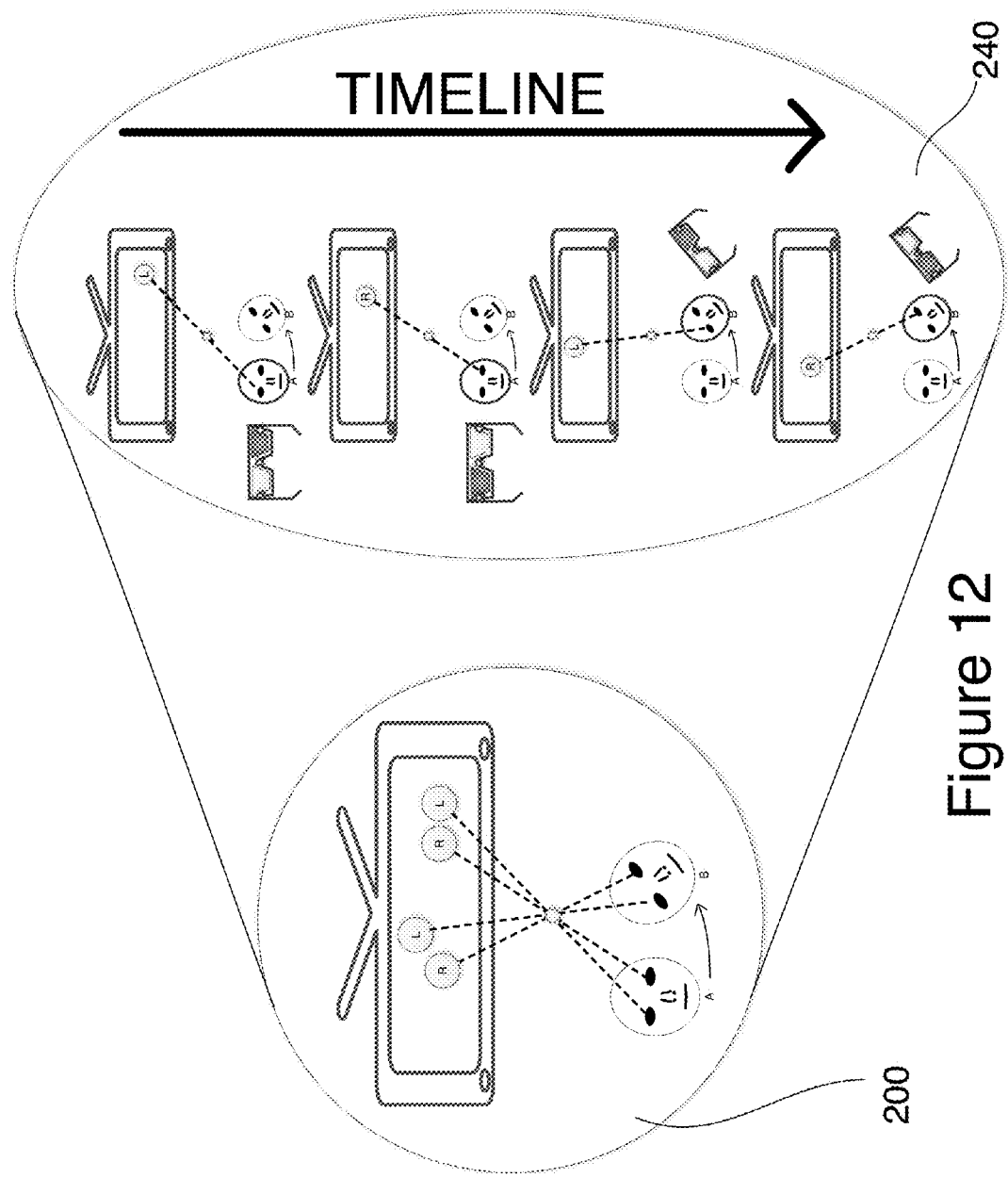
FIG. 12 is a schematic diagram illustrating an embodiment applying shutter glasses and viewpoint location sensing where images may be displayed as time progresses.

With reference now to FIG. 12 of the drawings, there is shown an illustration of an embodiment of the present invention. This illustration shows progression through time. Item 200 shows how as viewing location is changed, the 3D stereoscopic images location remains unchanged in space. Item 240 shows how this is accomplished by enabling each prospective viewpoint to see an image created based on the viewpoints perspective as viewing location differs. In this illustration, item 240 shows employment of shutter glasses to accomplish this effect.

Figure 13:
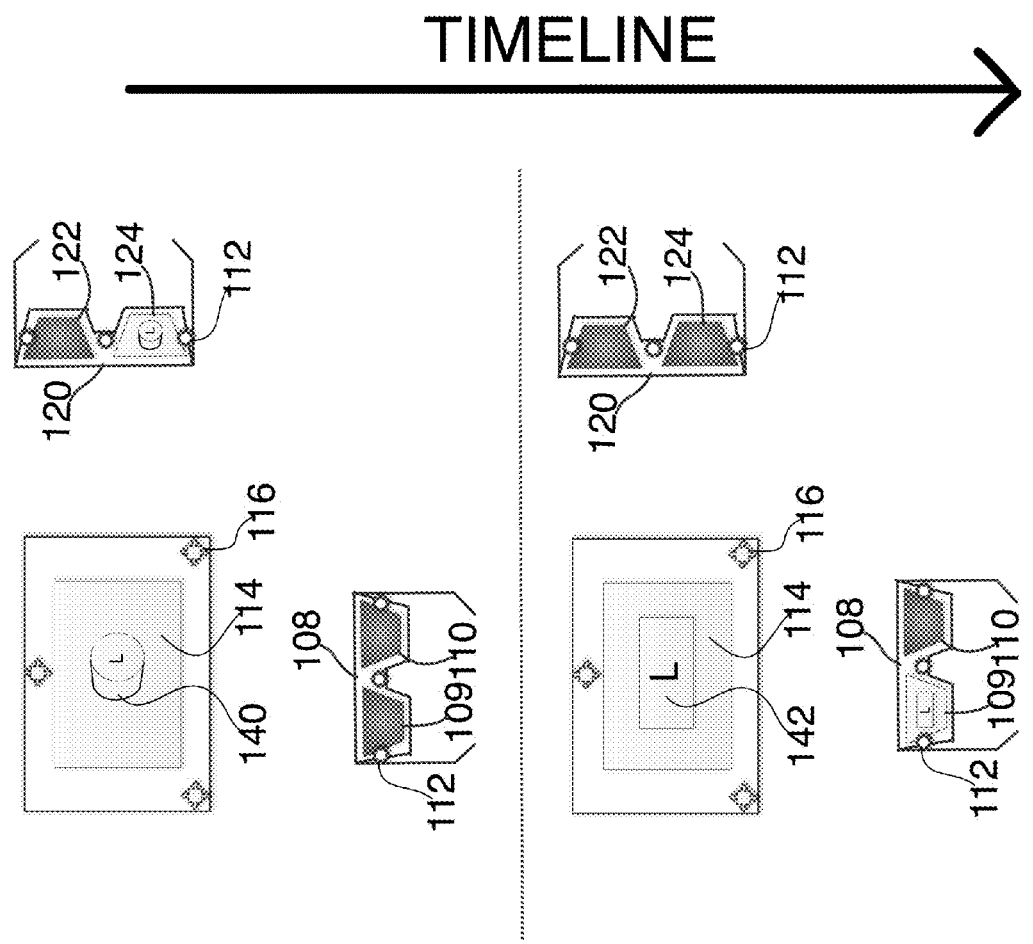
FIG. 13 is a schematic diagram illustrating an embodiment applying shutter glasses and viewpoint position sensing where images may be displayed as time progresses.
Figure 14:
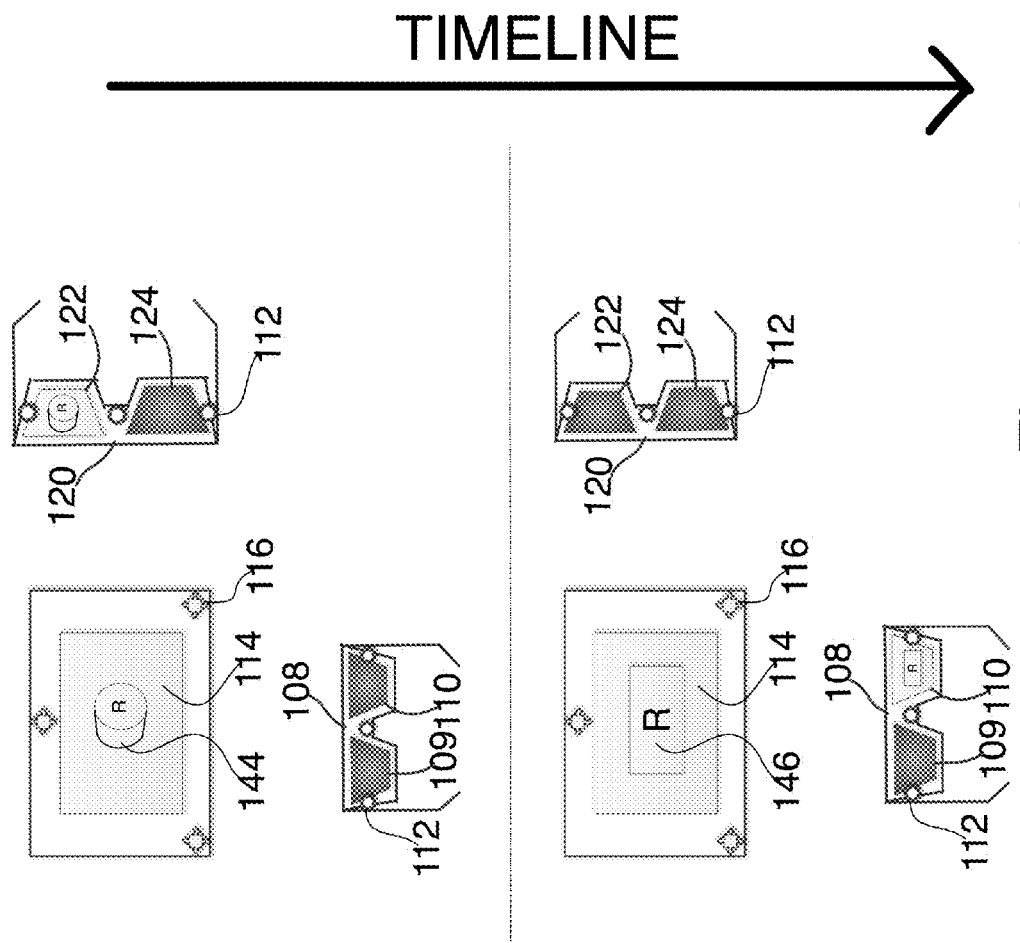
FIG. 14 is a schematic diagram illustrating an embodiment applying shutter glasses and viewpoint position sensing where images may be displayed as time progresses.

With reference now to FIGS. 13 and 14 of the drawings, there is shown an illustration of an embodiment of the present invention. This illustrates a more detailed rendering of what is occurring in item 240 from FIG. 12. Images 140, 142, 144, and 146 are created based on the perspective locations sensed of the lenses (items 109, 110, 122 and 124)

of the glasses (items 108 and 120) through which the image will be viewed. As the shutters open and close the image is presented with correct optical association so that a 3D image will be seen. Said 3D image is seen from various perspectives as it would be seen were the object immovable. Therefore the 3D object image appears in the same location no matter the viewing angle or distance. The viewing location is only limited by the size of the screen (item 114).

Figure 15:
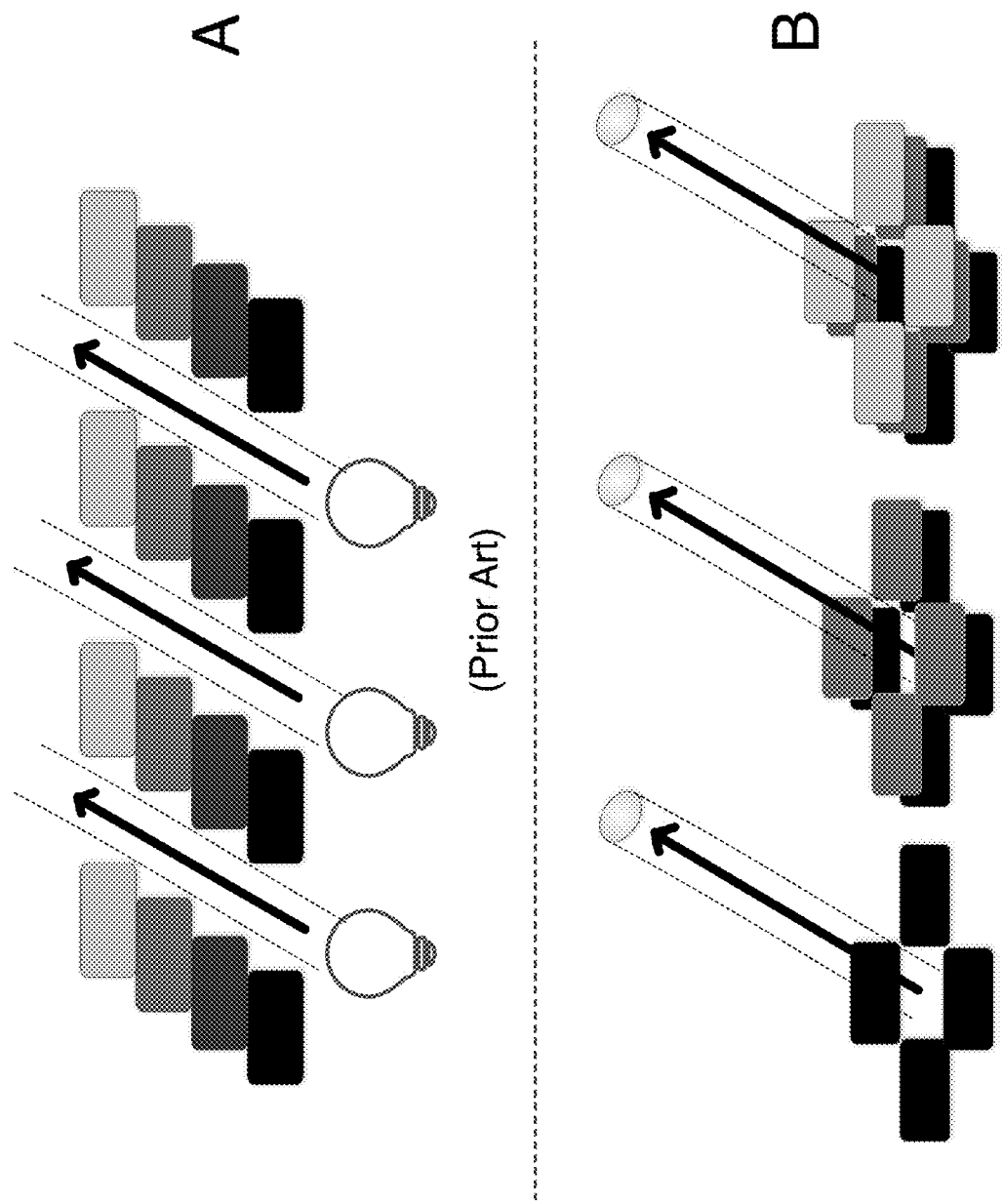
FIG. 15 is a schematic diagram illustrating prior art directional louvers and also an embodiment applying directional louvers in both horizontal and vertical directions.

With reference now to FIG. 15 of the drawings, there is shown an illustration of the prior art and also an embodiment of the present invention.

In part A prior art is shown which uses louvers created by layers of liquid crystals which have a blocking function in the position of a "Z" shape. Since it is created of liquid crystals it may be reconfigured frame by frame to allow light to pass to the left or right eye in correct optical association with a first or second image so that a 3D stereoscopic effect is achieved without the need for glasses. The present invention improves upon this by enabling the louvers to vary position and rotational angle. Thereby a single viewer can see a 3D stereoscopic image in the same location in space as his viewing perspective changes and/or the head is tilted.

In part B the present invention improves upon the concept of louvers by using them in both vertical as well as horizontal planes. However, the louvers may be configured along any combination of axis in any shape or pattern. Several shapes or patterns of louvers will be illustrated further in the description and endless varieties are possible. The result is guiding or aiming light as if through straws. The cross section of the guiding straws may be one of many shapes or patterns. The aiming or guiding viewpoint location is the location picked up by the location sensors. The louvers are created to optimize viewing at the correct perspective location. In the present invention they may be angled differently at different locations of the screen to optimize this effect. This allows the viewpoint to be in any plane or angle. In this configuration it is possible for two or more viewers to observe the intended 3D stereoscopic image in the same location in space.

Figure 16:
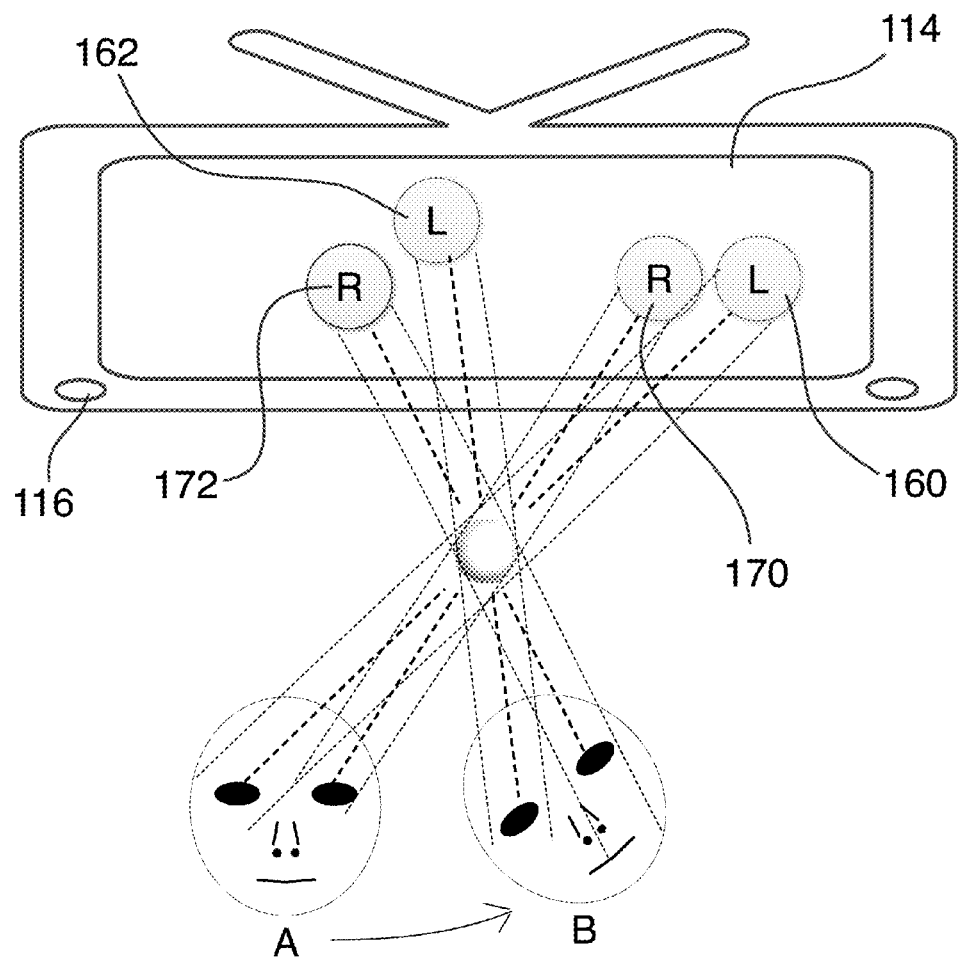
FIG. 16 is a schematic diagram illustrating an embodiment applying directional louvers in both horizontal and vertical directions and applying viewpoint location sensing.

With reference now to FIG. 16 of the drawings, there is shown an illustration of an embodiment of the present invention. This shows how louvers may be employed to direct the correct image with optical association to the proper viewpoint as determined by sensors (item 116), so a 3D stereoscopic image is seen. Note the 3D stereoscopic object image does not change location in space as viewpoint is changed.

Figure 17:
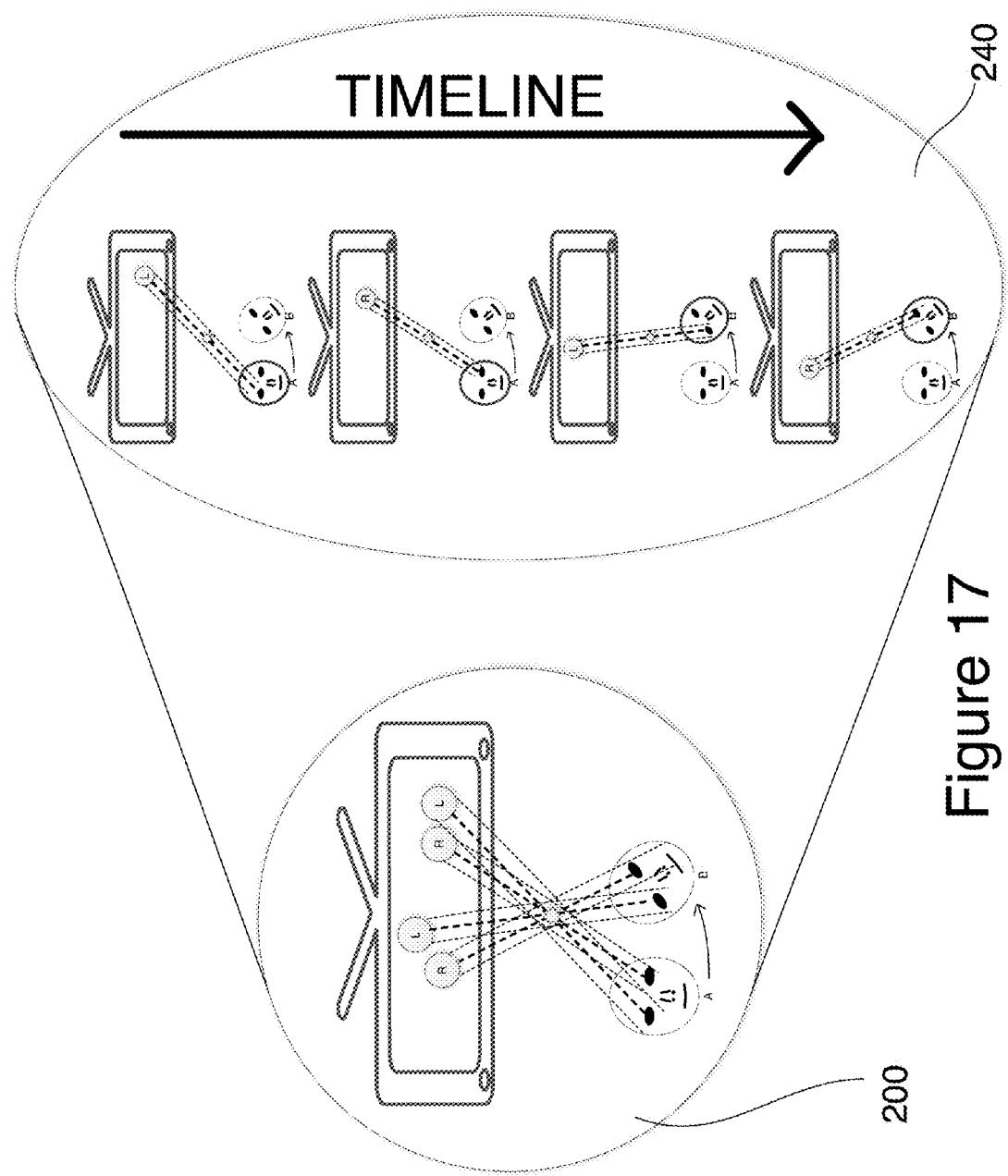
FIG. 17 is a schematic diagram illustrating an embodiment applying directional louvers in both horizontal and vertical directions and applying viewpoint location sensing where images may be displayed as time progresses.

With reference now to FIG. 17 of the drawings, there is shown an illustration of an embodiment of the present invention. This illustration shows progression through time. Item 200 shows how as viewing location is changed, the 3D stereoscopic images location remains unchanged in space. Item 240 shows how this is accomplished by enabling each prospective viewpoint to see an image created based on the viewpoints perspective as viewing location differs. In this illustration, item 240 shows employment of louvers to accomplish this effect.

Figure 18:
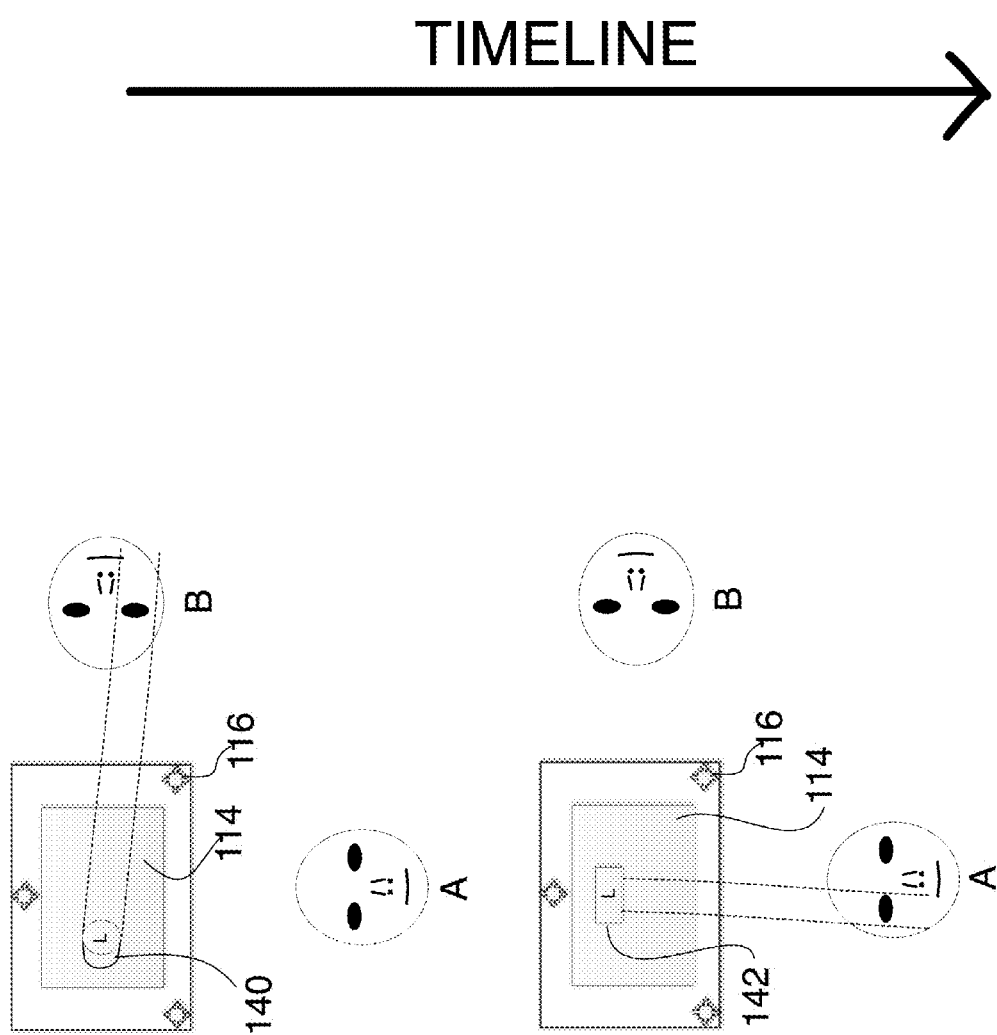
FIG. 18 is a schematic diagram illustrating an embodiment applying directional louvers in both horizontal and vertical directions and applying viewpoint location sensing where images may be displayed as time progresses.
Figure 19:
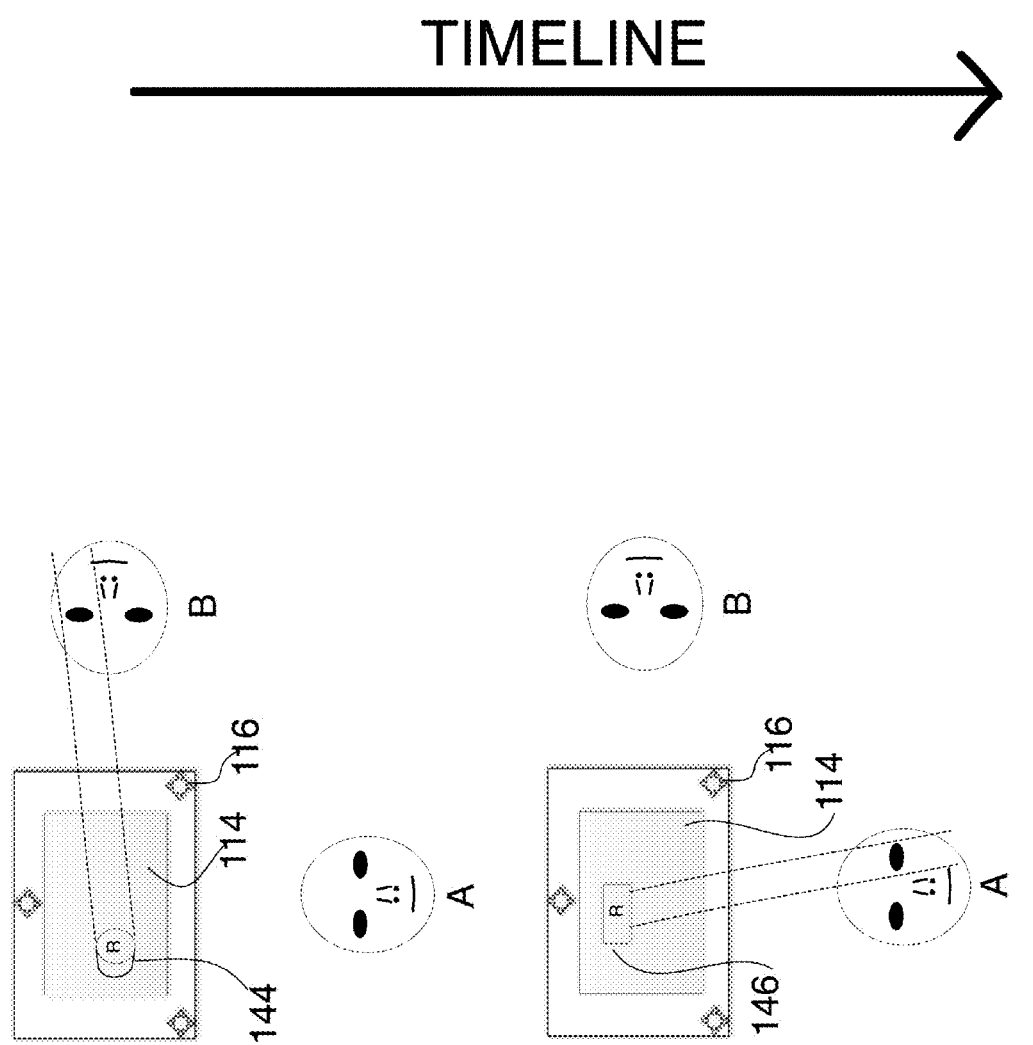
FIG. 19 is a schematic diagram illustrating an embodiment applying directional louvers in both horizontal and vertical directions and applying viewpoint location sensing where images may be displayed as time progresses.

With reference now to FIGS. 18 and 19 of the drawings, there is shown an illustration of an embodiment of the present invention. This illustrates a more detailed drawing of what is occurring in item 240 from FIG. 17. Images 140, 142, 144, and 146 are created based on the perspective locations sensed of the eye through which the image will be viewed. As the louvers change position to guide the light from the created images to the eye with correct optical association so that a 3D image will be seen. The 3D stereoscopic object image is seen from various perspectives as it would be seen were the object immovable. Therefore the 3D object image appears in the same location no matter the viewing angle or distance. The viewing location is only limited by the size of the screen (item 114).

Figure 20:
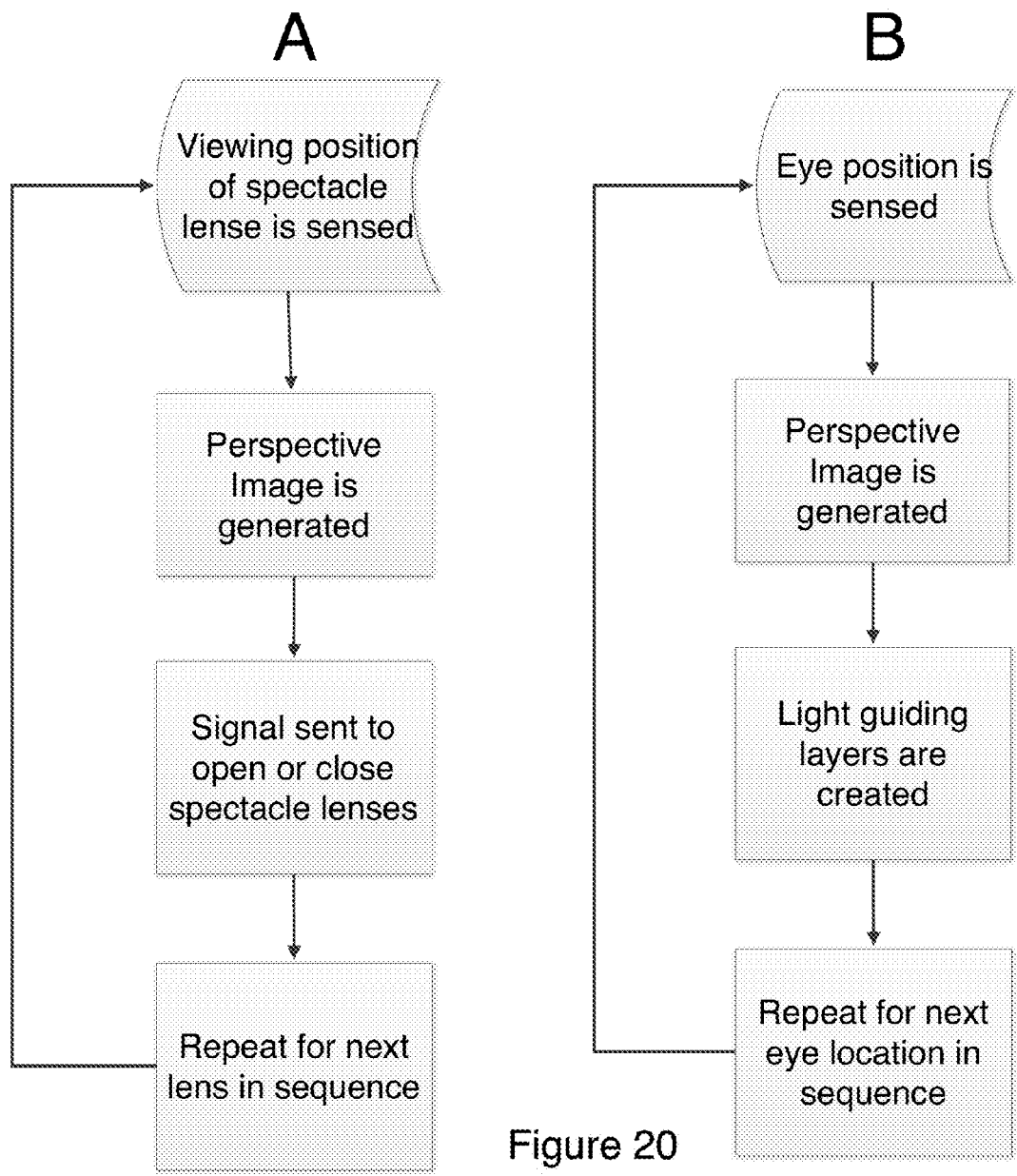
FIG. 20 is a schematic diagram illustrating an embodiment applying viewpoint position sensors and image generators. Either shutter glasses or electronically configurable dual axis louvers may be applied.

With reference now to FIG. 20 of the drawings, a flow diagram of an embodiment the present invention is presented which shows two methods for creating 3D stereoscopic images which are seen from different perspectives while the 3D stereoscopic object is seen in the same location in space. One method employs shutters and the second method employs louvers. However this is not intended to limit the device to these two methods, and any method which produces the same results may be used.

Figure 21:
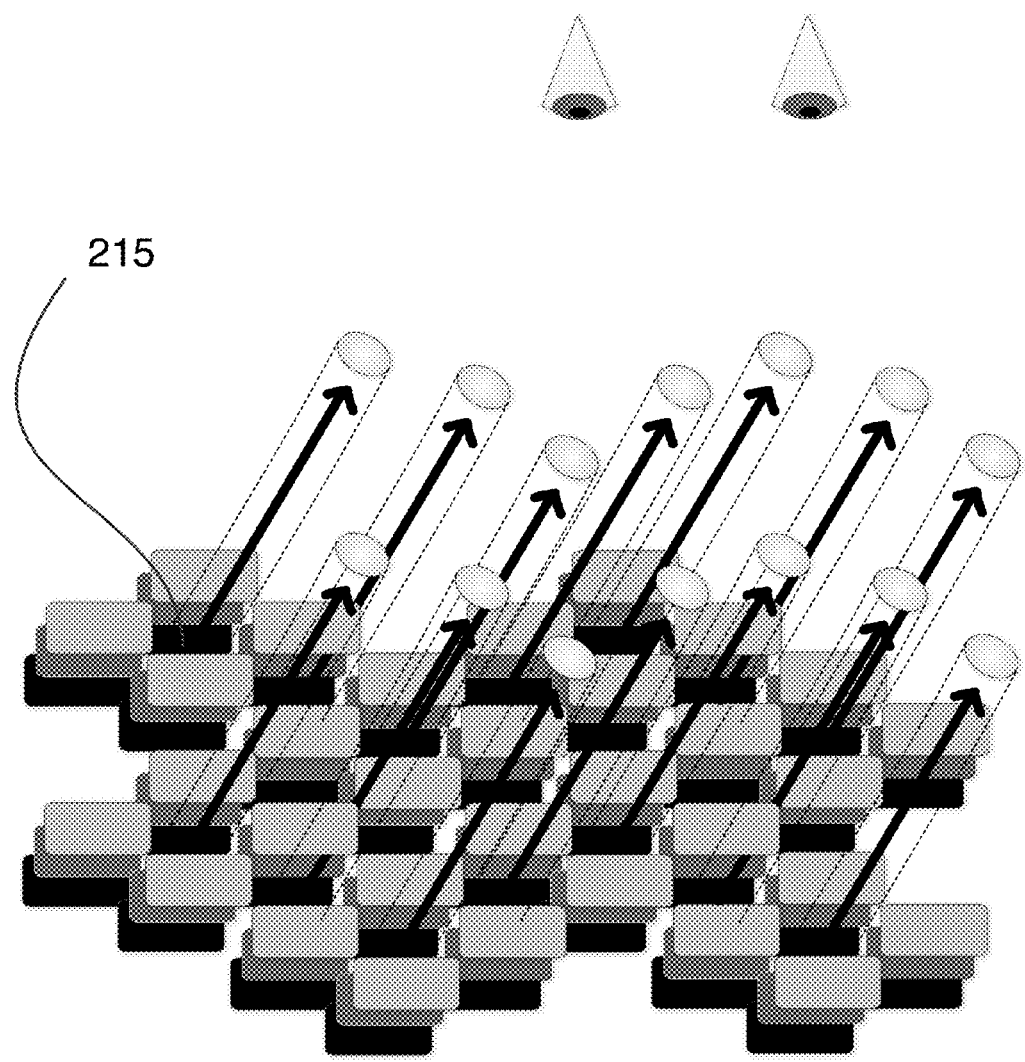
FIG. 21 is a schematic diagram illustrating an embodiment applying louvers.

With reference now to FIG. 21 of the drawings, there is shown an illustration of an embodiment of the present invention. In this embodiment the display (item 215) has layers of two dimensional louvers placed over it. By two dimensional louvers it is meant the louvers are able to block light (or guide light) in both the horizontal and vertical directions at the same time. This is not meant to be limiting in any way. Any combination of more than one axial direction of louvers which guide the light to the correct viewpoint in coordination with the correct image and in the intended manner may be used. These louvers may be referred to as electronically configurable light guiding louvers, or louvers In this illustration, the louvers are arranged in parallel.

The tubes with arrows represent the path light from the image would take. In the following illustrations, it will be shown how a variable pitch in both horizontal and vertical directions will enable light to pass to the viewing location. Thereby the image is seen only at the intended viewing location. The louvers may be of varying shapes and number of layers. They may also be made to move or change from frame to frame so as not to produce blind spots.

Figure 22:
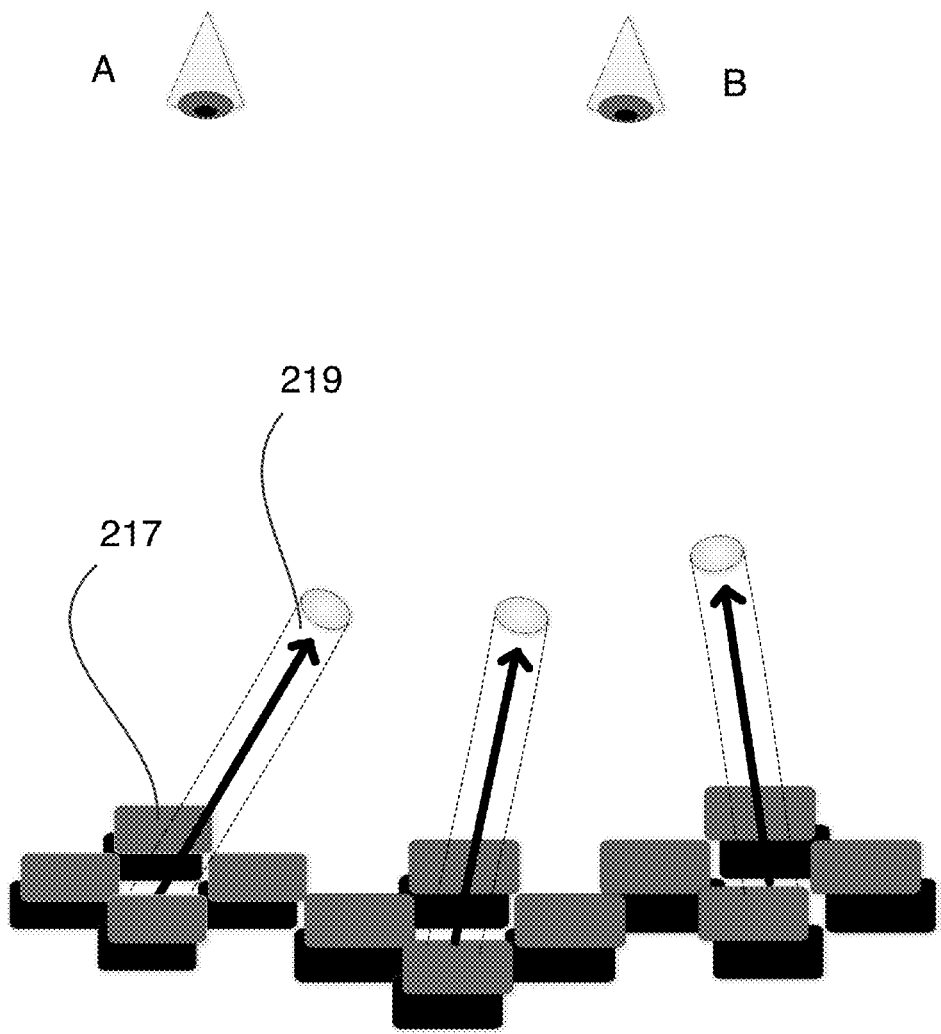
FIG. 22 is a schematic diagram illustrating an embodiment applying louvers and position sensors.

With reference now to FIG. 22 of the drawings, there is shown an illustration of an embodiment of the present invention. Louvers (item 217) with horizontal and vertical components are shown. These shall be referred to as electronically configurable light guiding louvers, or louvers. Using input from the position sensors a computer calculates the optimum configuration of the louvers. These louvers may have variable pitch in more than one axes; thereby they are able to guide light from the image display through imaginary tubes (item 219) towards the intended viewpoint. In this case the eye at point B. It should be noted that the in this illustration the eye at point A is not at an intended viewing location and therefore sees no light from the image when it is projected or guided to viewpoint B.

In this way a first or left image may be viewed by the left eye and a second or right image may be viewed by the right eye. In this way the created images may be directed with correct optical association so that a 3D stereoscopic image is seen. In addition the location from which each image is seen is limited. This permits additional viewers to also receive 3D stereoscopic images which are different from the first viewer. In the case of this invention, those images would be of the same 3D object image in the same location in space as viewed from each viewer's unique individual perspective.

Figure 23:
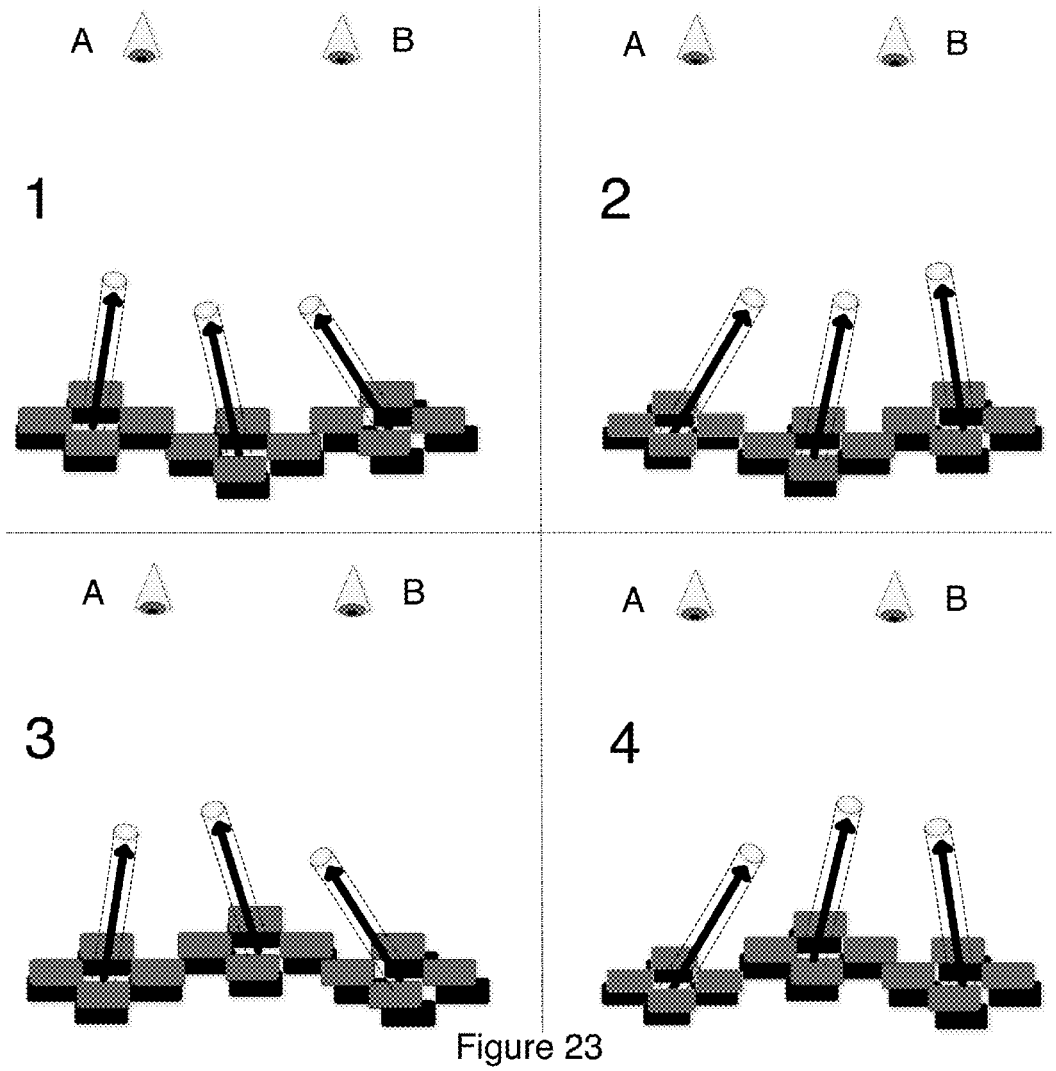
FIG. 23 is a schematic diagram illustrating an embodiment applying louvers and position sensors.

With reference now to FIG. 23 of the drawings, there is shown an illustration of an embodiment of the present invention. In this illustration, we see the dual louver method in time sequence from 1 to 4. In the first sequence the dual louvers direct a first image to viewpoint A. In the second sequence the dual louvers direct a second image to viewpoint B. In the third sequence the dual louvers direct a first image to viewpoint A. In the fourth sequence the dual louvers direct a second image to viewpoint B. In sequences 3 and 4 the viewer may be the same as in sequences 1 and 2 or they may be a second viewer. In each case the image viewed has been created for the particular viewpoint. In this way multiple viewers may enjoy the 3D image regardless of their viewing orientation. Furthermore, in this illustration the louver patterns in sequences 3 and 4 are slightly different than those of sequences 1 and 2. This is a technique which may be used to eliminate dark spots from occurring in the image where the same pixel would be blocked by dual louvers. By moving the louvers from frame to frame this problem can be alleviated.

Figure 24:
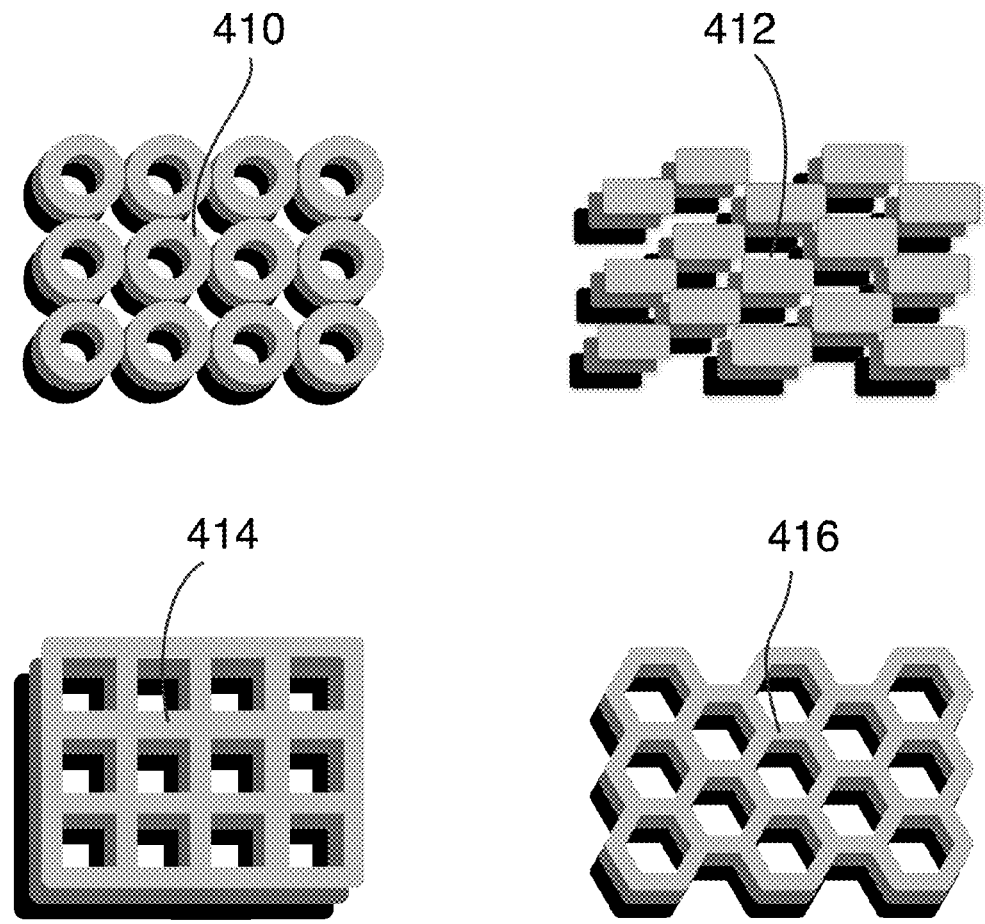
FIG. 24 is a schematic diagram illustrating an embodiment applying louvers and position sensors.

With reference now to FIG. 24 of the drawings, there is shown an illustration of an embodiment of the present invention. This illustrates dual louvers of various configurations. These are meant to illustrate, but not to limit configurations of dual louvers. The shape of which dual louvers may be made is virtually unlimited. Item 410 illustrates a circular pattern. Item 412 illustrates an alternating pattern. Item 414 illustrates a box pattern. Item 416 illustrates a hexagonal pattern. The size, shape, and number of layers of the dual louvers may be varied to produce the desired light guiding effect. In addition they may be moved around so as to reduce or eliminate the same pixel from being blocked by the louvers over several image presentations.

Figure 25:
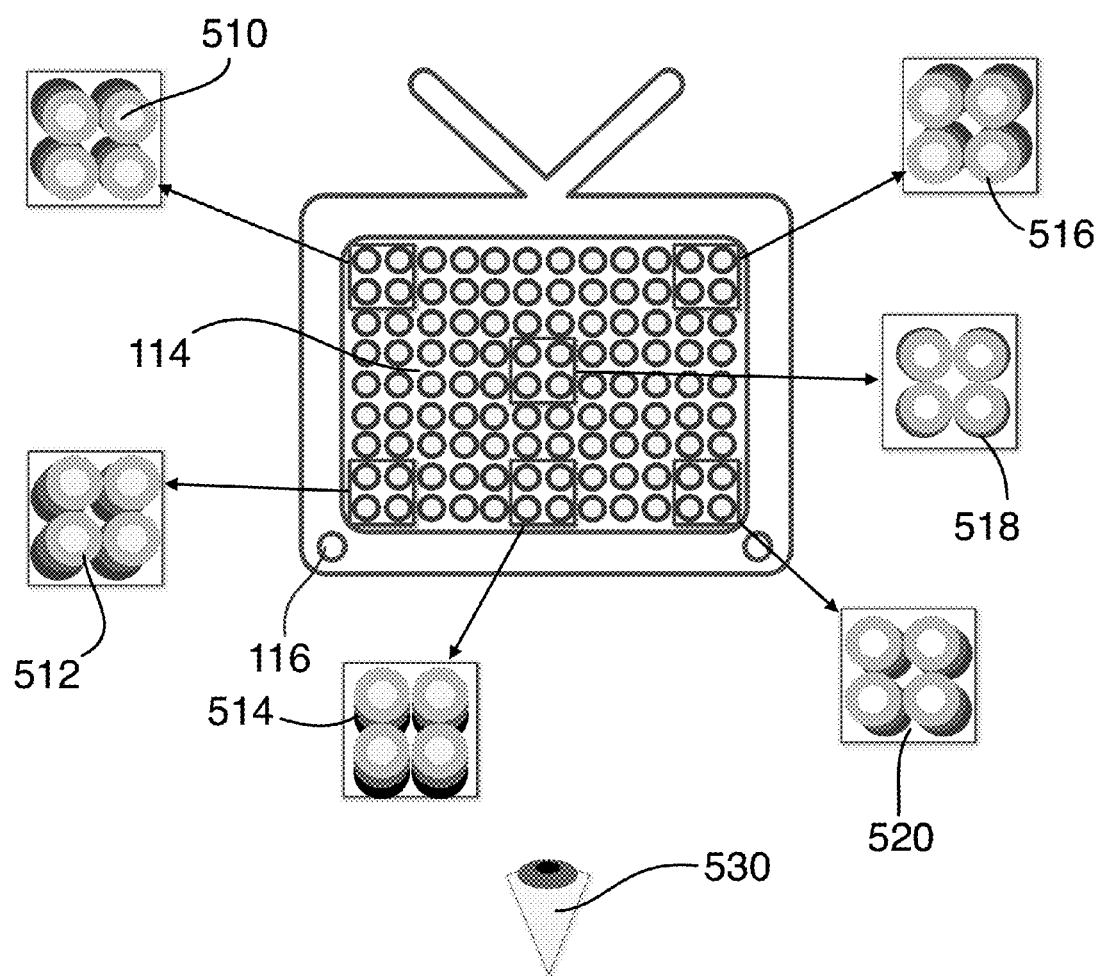
FIG. 25 is a schematic diagram illustrating an embodiment applying louvers and position sensors.

With reference now to FIG. 25 of the drawings, there is shown an illustration of an embodiment of the present invention. In this illustration, the relationship between the viewpoint position sensed by the sensor (item 116) and the electronically configurable louver patterns is explained in further detail. In this illustration, the display (item 114) has cross sections expanded so that louvers from various locations of the display may be further illustrated. In this illustration, the viewpoint (item 530) is located directly in front of section 518 of the display (a location nearly centered in front of the display). So in order for the image to be seen form the viewpoint of item 530 the louvers of item 510 at the top left of the display must guide the light downward and towards the right. Likewise the louvers of item 516 of the upper right corner must guide the light from the image downwards and to the left. The louvers of item 512 must guide light upwards and to the right. The louvers of item 514 must guide the light upwards. Those of item 520 must guide the light upwards and to the left. Those located directly in front of the viewing location should guide the light mostly straight ahead.

It must be noted that as viewing location changes both the perspective image must be changed, as well as the angle of the louvers at all locations across the viewing display. The viewing location is sensed and a correct image creation and sequence is produced for viewing by left and right eyes of one or more viewers, in correct optical association with the electronically configurable louvers so that a 3D stereoscopic image is seen by one or more viewers.

Figure 26:
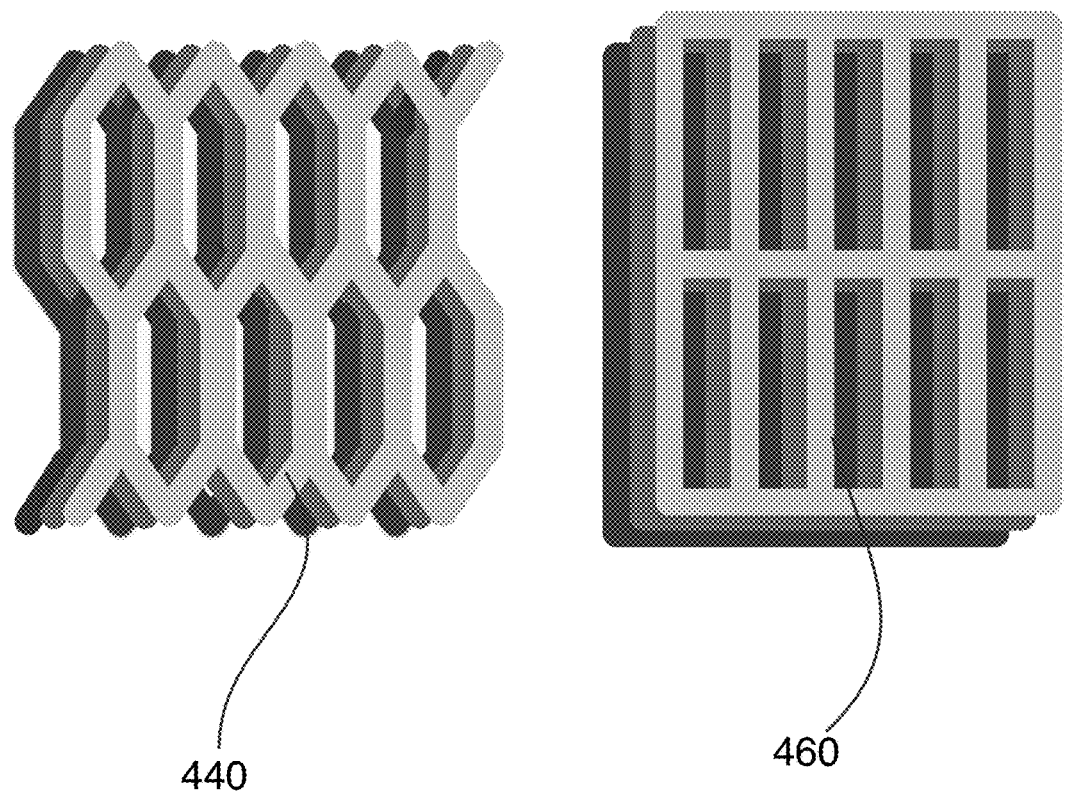
FIG. 26 is a schematic diagram illustrating an embodiment applying louvers and position sensors.

With reference now to FIG. 26 of the drawings, there is shown an illustration of an embodiment of the present invention. This illustrates sample electronically configurable louver patterns. In these examples the vertical component of the louvers is larger than the horizontal. The taller axis may be rotated to correct for a tilted head angle of the viewer. The taller portion is intended to coincide with the vertical axis of a viewer's face. This has the advantage of allowing more light to pass through the louvers while allowing one of a pair of viewpoints to see the image while the image is blocked form the other in a pair of viewpoints. By pair of viewpoints one may consider a left and right eye. These examples are not meant to limit the shape or pattern of the louvers.

Figure 27:
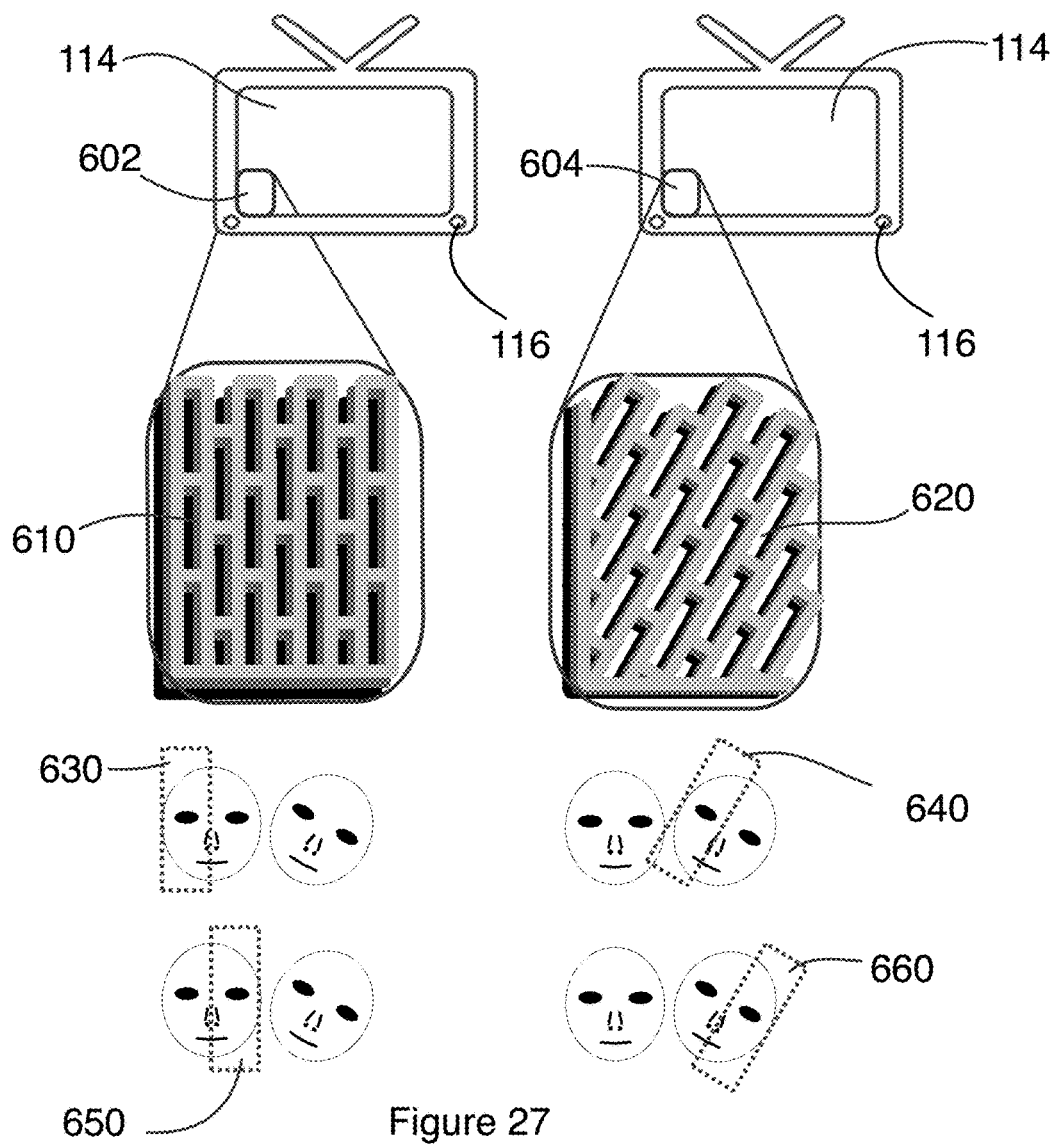
FIG. 27 is a schematic diagram illustrating an embodiment applying louvers and position sensors.

With reference now to FIG. 27 of the drawings, there is shown an illustration of an embodiment of the present invention. This illustrates how electronically configurable louvers may be applied so that the intended viewing location receives the correct optical image while other viewing locations do not.

In this illustration, a small portion (item 602) of the display (item 114) is expanded (item 610). In item 610 we see configurable louvers which operate in both the vertical and horizontal directions to guide the light from the display image. Item 630 shows an approximate area where the light from a first image may strike the intended side of a viewers face. Item 650 shows an approximate area where the light from a second image may strike the other side of a viewers face. In this way a large area of light from the image is able to pass through the louvers to the intended viewers eye while limiting the light from the image which would be seen at another location.

In this illustration, another small portion (item 604) of the display (item 114) is expanded (item 620). In item 620 we see configurable louvers which operate in both the vertical and horizontal directions to guide the light from the display image. In this case the viewers head is tilted at an angle relative to the display (item 114). The configurable louvers (item 620) now tilt to match the angle of tilt of the viewers head. Item 640 shows an approximate area where the light from a first image may strike the intended side of a viewers face. Item 660 shows an approximate area where the light from a second image may strike the other side of a viewers face. By applying louvers which are taller than they are wide, a larger amount of light from the image is able to pass through the louvers to the intended viewer's eye while limiting the light from the image which would be seen at another location.

One means to accomplish this is for the sensors to sense objects which enable a facial recognition and therefore location and pairing information of the eyes. Another method may involve a computing device which compares locations of eyes and creates pairs via an algorithm based on distance between eyes or some other method. Other methods for locating paired eye positions include, but are not limited to sensing light reflective or light transmitting devices located on the face or on a wearable device such as glasses, a hat, necklace etc. The means given to recognize a pair of eyes, viewpoints or facial features is for illustrative purposes only and is not meant to be limiting in any way.

Additionally, the ability to guide the light from the display to a specific area allows a privacy mode. This mode may use but not be limited to, facial recognition computation, eye pattern recognition or other means such as proximity are used to allow viewing by one person only. The electronically configurable light guiding louvers of more than one axis function to channel the light to the eyes of a single viewer. The electronically configurable light guiding louvers of more than one axis function to channel the light from the displayed image to the eyes of a single viewer. If desired, the number of people who may view the displayed image in privacy mode may be manually increased.

Figure 28:
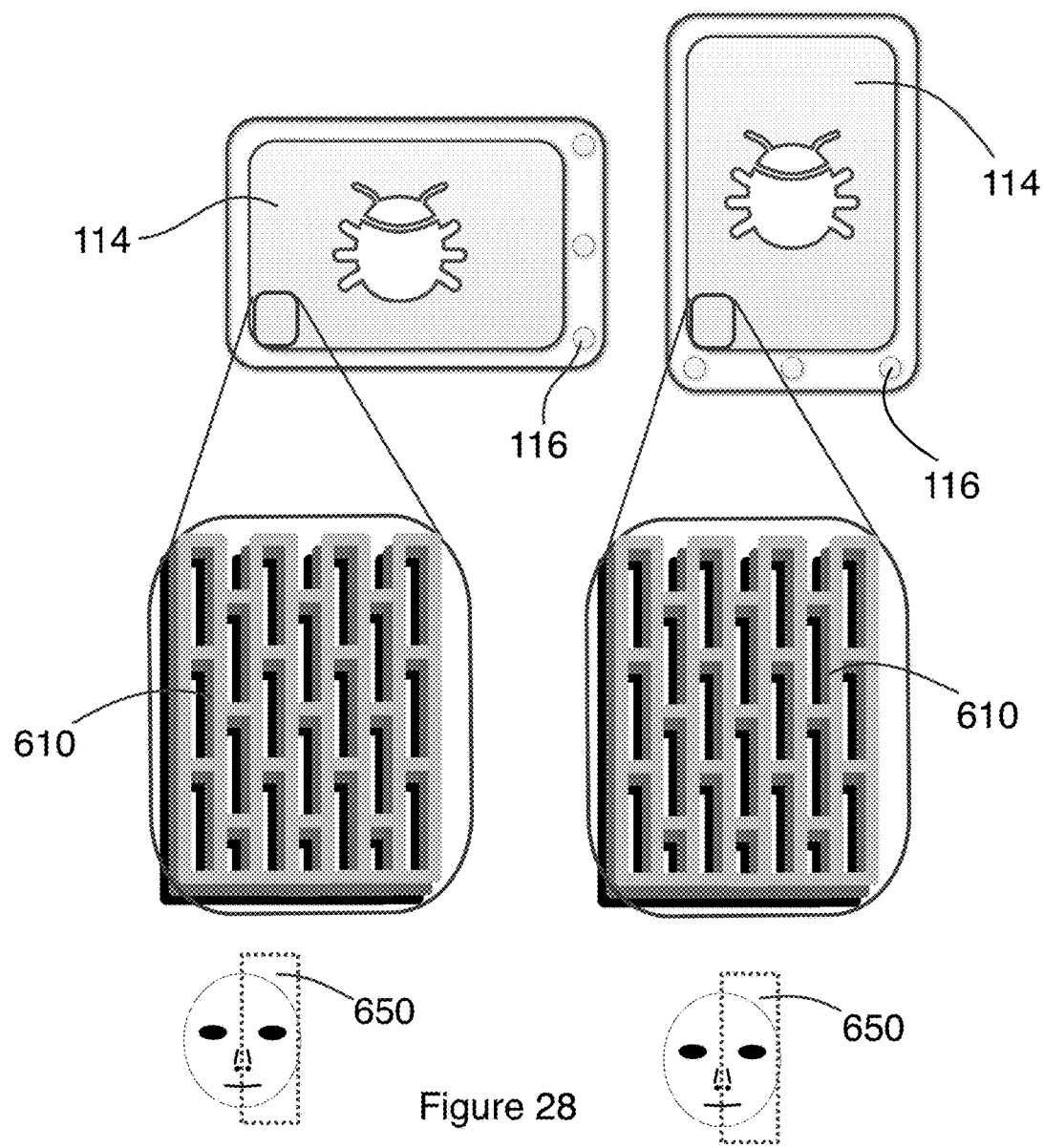
FIG. 28 is a schematic diagram illustrating an embodiment in portrait and landscape modes applying louvers and position sensors.

With reference now to FIG. 28 of the drawings, there is shown an illustration of an embodiment of the present invention. In this illustration, a handheld device is shown which may be used in both portrait and landscape modes. In this illustration configurable louvers are used to create an auto stereoscopic 3D image. However, the method of shutter glasses may also be applied. To accomplish this end a display orientation sensor is applied. This sensor may be gravity sensing, motion or inertia sensing, but is not limited to these technologies.

Figure 29:
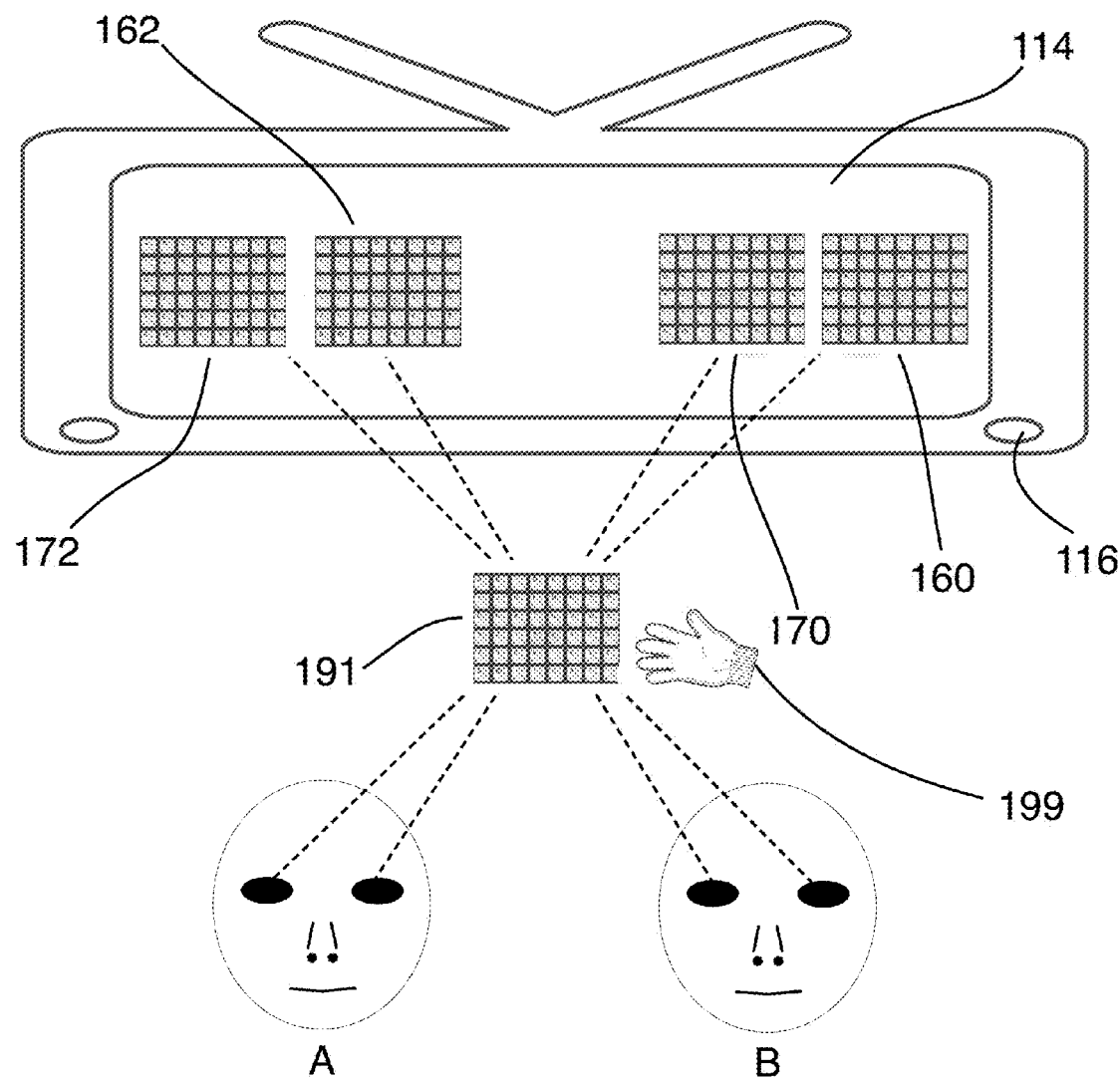
FIG. 29 is a schematic diagram illustrating an embodiment applying position sensors and illustrating user interaction with a virtual image.

With reference now to FIG. 29 of the drawings, there is shown an illustration of an embodiment of the present invention. In this illustration a 3D stereoscopic image of a keyboard is shown. The virtual image of the keyboard in space is approximately the same for most viewing locations. As such, it's virtual location in space and the virual location in space of each individual key on the keyboard may be calculated by the devices computers. In this embodiment, either the method applying shutter glasses, or the method applying louvers may be used.

In addition a pointer, body part or wearable device may be located by the sensors and their position in space may likewise be calculated or quantified. A wearable device such as a glove may contain position markers of reflective or emissive materials which enable sensors to accurately determine it's location in space and for the case of a glove also the fingers. An advanced sensor may be able to detect the location of fingers without the need for gloves with position markers. In this embodiment, either the method applying shutter glasses, or the method applying louvers may be used.

As the location of the 3D stereoscopic keyboard and also a pointer or pointers location is known, it may now be possible through computation to determine when the body part or pointer is in proximity to places on the keyboard. In this manner keyboard entries may be made. This is similar to what occurs on a 2D screen with touch sensing. The difference being the typing takes place on a virtual image as opposed to a solid surface. In this embodiment, either the method applying shutter glasses, or the method applying louvers may be used.

The virtual keyboard and any other virtual object may be interacted in a multitude of other ways. These include stretching and shrinking, twisting and turning and any other ways a 2D touch object could be manipulated. The understanding is that for the 3D virtual touch object, 3 axis rather than 2 axis, may be applied and manipulated. In this embodiment, either the method applying shutter glasses, or the method applying louvers may be used.

In addition, the virtual keyboard or any other virtual interactive device described below may be brought forth and/or removed by user gestures sensed by the systems location sensors. In addition gestures sensed by the location sensors may be used for other functions, such as but not limited to turning the pages of an electronic book, changing stations on a television, or raising or lowering volume of the display system or other components.

Figure 30:
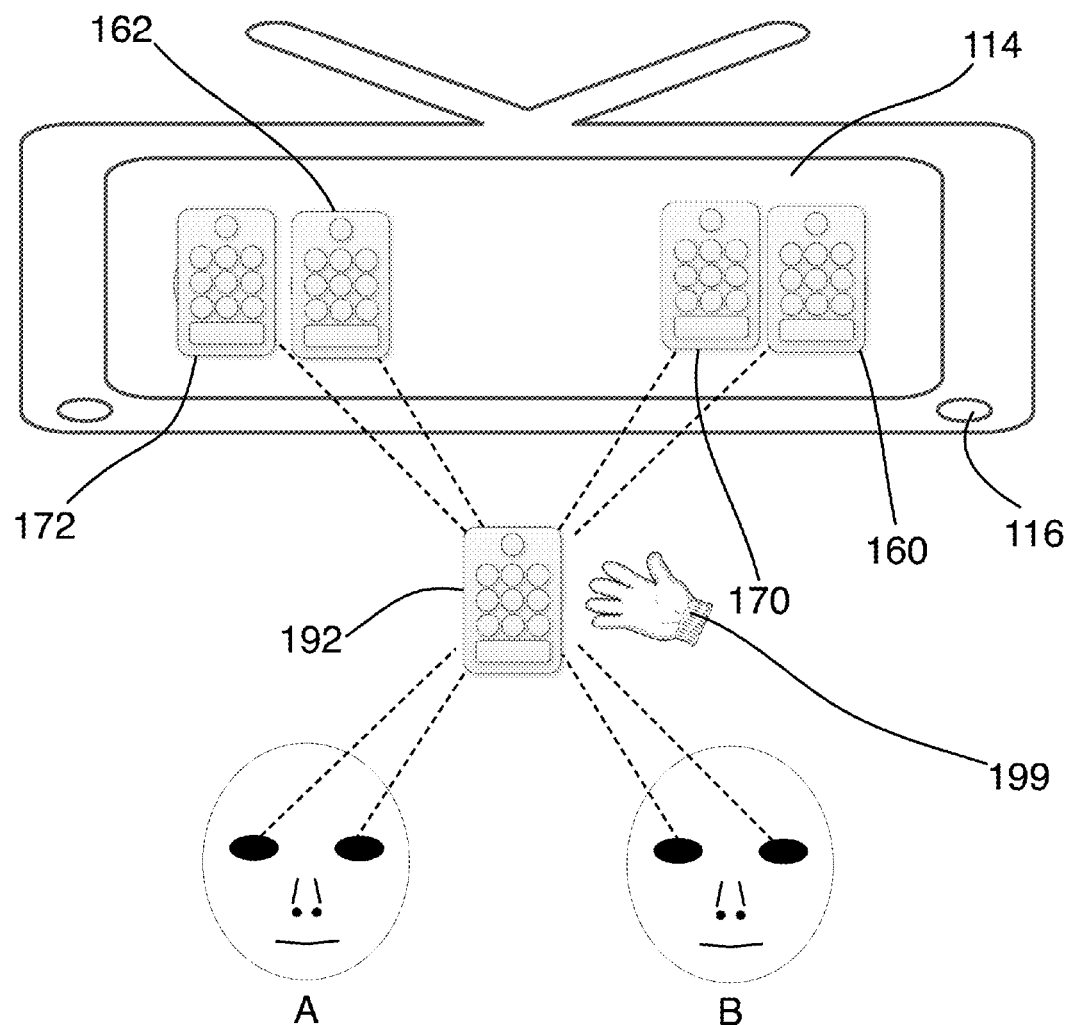
FIG. 30 is a schematic diagram illustrating an embodiment applying position sensors and illustrating user interaction with the virtual image.

With reference now to FIG. 30 of the drawings, there is shown an illustration of an embodiment of the present invention. In this illustration a 3D stereoscopic image of a remote controller is shown. All of the properties described in illustration 29 apply. In addition, the remote controller may be applied to control objects outside the device. This may be accomplished by applying wifi, Bluetooth or other wireless means. In addition by applying the internet items at a large distance from the display may be controlled. In this embodiment, either the method applying shutter glasses, or the method applying louvers may be used.

Figure 31:
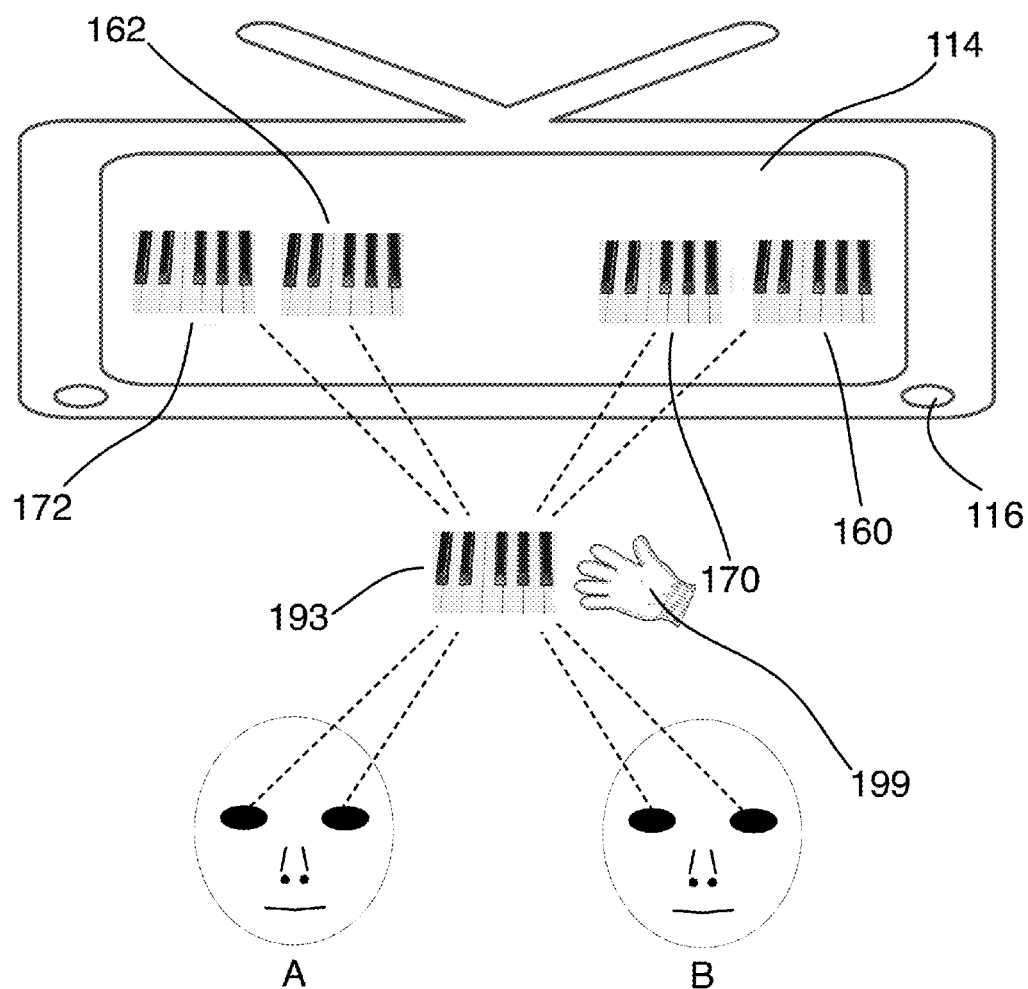
FIG. 31 is a schematic diagram illustrating an embodiment applying position sensors and illustrating user interaction with the virtual image.

With reference now to FIG. 31 of the drawings, there is shown an illustration of an embodiment of the present invention. In this illustration a 3D stereoscopic image of a keyboard is shown. All of the properties described in illustration 29 apply. Placing, touching, pressing, or otherwise gesturing at the keyboard may through a computer interface produce sound or music. The virtual keyboard shown is for illustrative purposes and is not intended to be limiting. Other virtual musical instruments include, but are not limited to drums, percussion instruments, wind wood instruments, etc. In this embodiment, either the method applying shutter glasses, or the method applying louvers may be used.

Figure 32:
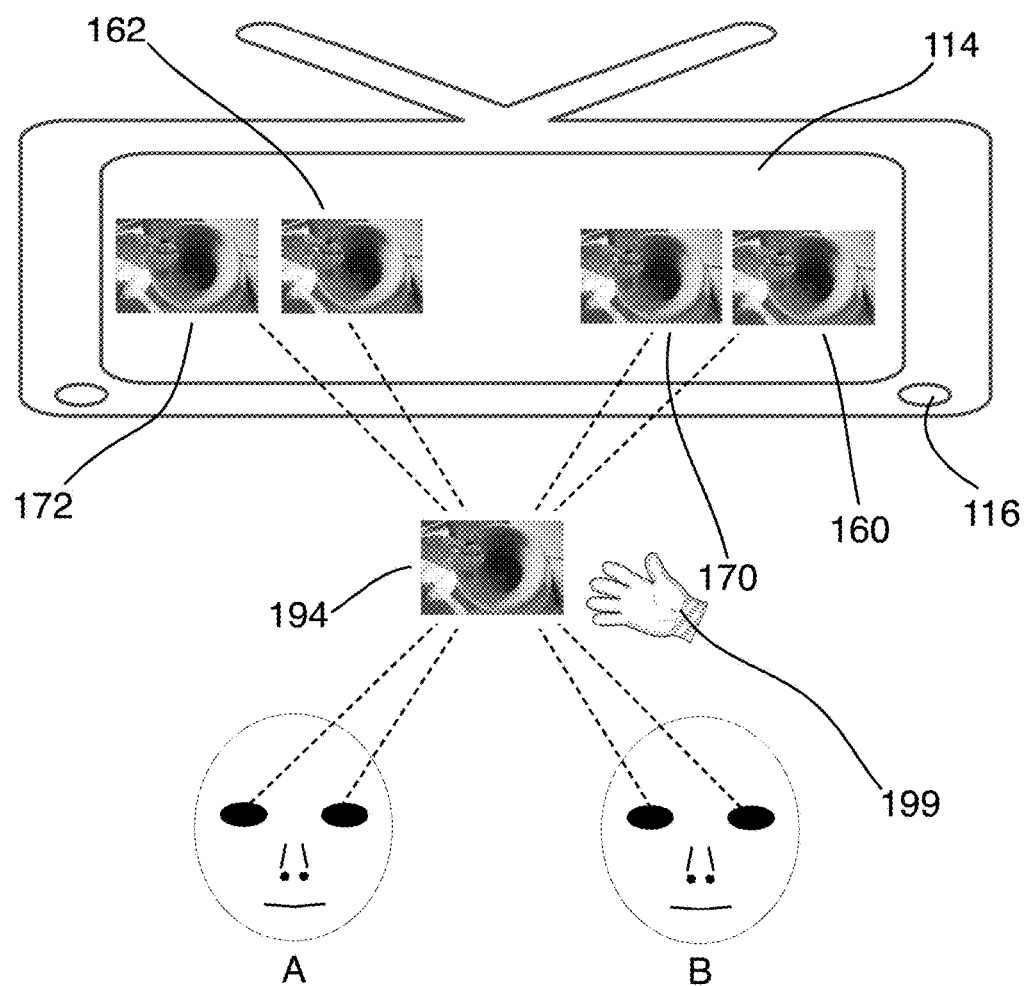
FIG. 32 is a schematic diagram illustrating an embodiment applying position sensors and illustrating user interaction with the virtual image.

With reference now to FIG. 32 of the drawings, there is shown an illustration of an embodiment of the present invention. In this illustration a 3D stereoscopic image of a pottery wheel is shown. All of the properties described in illustration 29 apply. Such a virtual image may be made to rotate and a virtual pottery creation may be created. All of the properties described in illustration 29 apply. The image may be manipulated by the user and saved for 3D printing or other uses. In like manner other objects may be created which do not require a rotational motion. In this embodiment, either the method applying shutter glasses, or the method applying louvers may be used.

Figure 33:
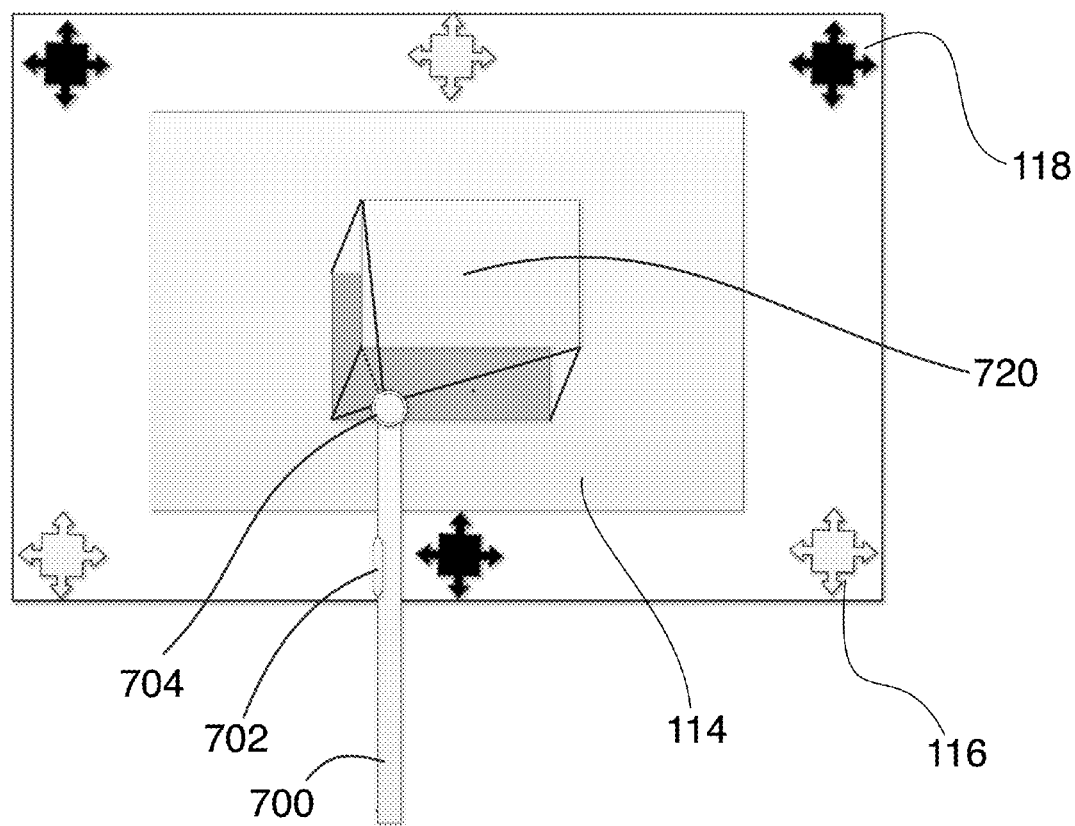
FIG. 33 is a schematic diagram illustrating an embodiment applying position sensors and illustrating user interaction with the virtual image.

With reference now to FIG. 33 of the drawings, there is shown an illustration of an embodiment of the present invention. In this illustration a 3D stereoscopic image of a box is shown. The box is manipulated by use of a pointing tool (item 700). This pointing tool may have a tip (item 704) of emissive material, reflective material or other means to make it's location easily read by the sensors. The pointer may also have one or more functional buttons (item 702). These buttons may operate in a similar fashion as buttons on a computer controller such as a mouse. By applying this pointer an object may be identified, grabbed and moved, sized or any number of functions commonly associated with the computer mouse. The difference being that the virtual objects and the pointer may be operated in 3 axis or dimensions. In this embodiment, either the method applying shutter glasses, or the method applying louvers may be used.

Figure 34:
FIG. 34 is a schematic diagram illustrating an embodiment applying position sensors and illustrating a virtual cave.

With reference now to FIG. 34 of the drawings, there is shown an illustration of an embodiment of the present invention. In this illustration a 3D stereoscopic virtual cave is shown which employs the technology previously illustrated. In such a cave the objects appear more real as they remain approximately fixed in space as the viewer and viewpoint location are changed. The objects in the virtual cave may be interacted with in the manner which has been described above. In this embodiment, either the method applying shutter glasses, or the method applying louvers may be used.

Figure 35:
FIG. 35 is a schematic diagram illustrating an embodiment applying position sensors and illustrating a virtual simulator.

With reference now to FIG. 35 of the drawings, there is shown an illustration of an embodiment of the present invention. In this illustration a 3D stereoscopic image of an aircraft simulator is shown. Varying amounts of the simulator may be simulated depending on the wants of the user. It may be that only objects outside of the control environment are simulated. However it is possible for virtual controls, buttons, switches and other controlling devices to be simulated and interacted with, in the manner described above. In addition the interior environment of the simulator may be created virtually. This enables simulators whose configuration may be controlled by applying computer software. For example a virtual flight simulator could be used as a B-737 for one event and reconfigured as an A-320 for the next event. This would save money for the user as fewer simulators would be needed. Other virtual simulations lend application to, but are not limited to, law enforcement and the military. In this embodiment, either the method applying shutter glasses, or the method applying louvers may be used.

Figure 36:
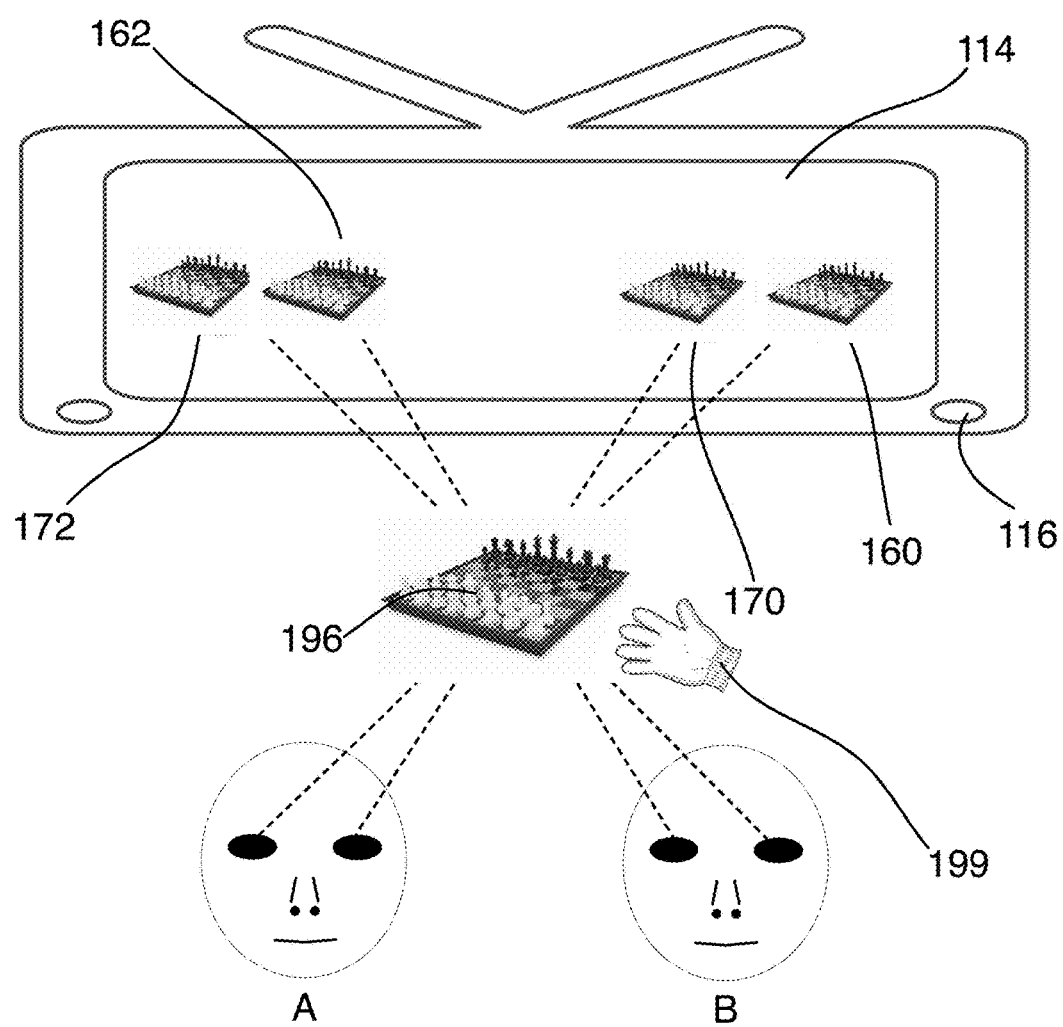
FIG. 36 is a schematic diagram illustrating an embodiment applying position sensors and illustrating a virtual gaming system.

With reference now to FIG. 36 of the drawings, there is shown an illustration of an embodiment of the present invention. In this illustration a 3D stereoscopic image of a game (item 196) is shown. The 3D virtual game pieces may be created and also manipulated by any of the methods previously described. All of the properties described in illustration 29 apply. The display system (item 114) may be made to lay flat so as to provide a better gaming surface. In this way board games and other types of games may be played and interacted with by the user or users. Virtual worlds may be created, viewed and/or interacted with. This embodiment of the present invention makes an excellent gaming system. In this embodiment, either the method applying shutter glasses, or the method applying louvers may be used.

Furthermore, the present invention may be switched to other modes of operation. These include but are not limited to prior art 3D stereoscopic imaging where the 3D stereoscopic image location varies with viewer location. This may be a useful mode for viewing prior art technology 3D imagery such as 3D movies. Also, the display may be used to view 2D images in the manner of prior art. The switching among the various 3D and 2D modes may be automatic based on the format of the viewing material. In this embodiment, either the method applying shutter glasses, or the method applying louver technologies may be used.

Furthermore, although exemplary embodiments have been disclosed herein, and although specific terms are employed, they are used and are to be interpreted in a generic and descriptive sense only, and not for purpose of limitation. Accordingly, it will be understood by those of ordinary skill in the art that various changes in form and details may be made without departing from the spirit and scope of the present invention as set forth in the claims.

By way of conclusion, the prior art in this area of technology encompasses displays of two types, one which produce a 3D stereoscopic effect when viewed through wearable shutter glasses, the second which produces a 3D stereoscopic image through the use of light guiding louvers. This prior art, such as the references cited herein, is limited by viewing location. In addition the prior art is limited to 3D stereoscopic images which may not be seen in approximately the same location as viewpoint changes nor when viewed by different users. This does not allow users to communicate about a 3D stereoscopic image by gestures, for example pointing, or gesturing. In the present invention 3D stereoscopic images or virtual images may also be interacted with by the user(s). This is accomplished by applying location sensing technology and comparing the data with the computed 3D virtual object location.

Additional prior art utilizes parallax barriers to obtain 3D stereoscopic effects. There is prior art which enables the parallax barriers to function in different display orientations. However, the prior art parallax barriers limit the eye placement of the viewer to a narrow range for large displays. In addition, since the louvers of prior art function in only one axis at a time they have difficulties sharing the 3D imagery with other viewers. Prior art is also limited to small devices for virtual 3D auto stereoscopic display systems.

The instant invention improves upon the prior art by improving upon the parallax barriers. The electronically configurable light guiding louvers have the advantage of variable pitch and multiple axis of blocking or guiding the light from the display. This allows multiple viewers to view large screen devices and share in the 3D experience. It also allows a privacy mode.

In addition, a 3D stereoscopic image may be created which remains approximately fixed in space. Such a virtual image may be pointed at by one or more viewers. Because the virtual image is nearly fixed in space it's virtual location may be compared with a user's finger, other body parts or pointer. In this way a viewer may interact with a virtual 3D image by pointing or other gestures as sensed by the position sensors. In addition the position sensors may be used to interpret a variety of gestures which correspond to a variety of commands. By using the position sensors gestures may be made which cause the display device to react to the viewer. Examples include but are not limited to gestures which call for a virtual keyboard or remote to be displayed. They may also cause a station of a television to change or the volume to increase or decrease. There are many more possibilities and this list of gestures and results is not intended to be limiting in any way.

These and other advantages are readily apparent to one who has viewed the accompanying figures and read the descriptions.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

While the foregoing written description of the invention enables one of ordinary skill to make and use what is considered presently to be the best mode thereof, it should be understood that various changes, substitutions and alterations can be made herein without departing from the spirit and scope of the invention as defined by the appended claims. Therefore, the invention is not to be limited by the above described embodiment, method, and examples, but by all embodiments and methods within the scope and spirit of the invention as claimed.

I claim:

1. An auto-stereoscopic image display device comprising:
   at least one sensor to track positions of eyes, based on facial recognition, in relation to the stereoscopic device;
   a processor configured to map coordinates of a three-dimensional (3D) virtual object generated by the stereoscopic display device, wherein the 3D virtual object has a location in the physical space in front of and relative to the display device;
   an image display panel configured to
      display separate pairs of first and second stereoscopic images of the 3D virtual object displayed to the eyes for each viewer of the stereoscopic display device so that the 3D virtual object is seen by each viewer in the same physical location, wherein the first and the second stereoscopic images for each viewer are based upon viewpoint perspectives of an angle and distance of the perspective location of the eyes of each viewer as detected by the at least one sensor,
      adjust at least two layers of blocking electronically configurable liquid crystal material in a repeating pattern of closed geometric shapes to block light along at least two axes, wherein each of the first and the second stereoscopic images for each viewer are directed to the left and right eyes of each viewer by passing through the layers of blocking electronically configurable liquid crystal material such that a different repeating pattern of closed geometric shapes for layers of material is configured for each individual user independent of a tilt angle of said user's head, and
      block light from the first and the second stereoscopic images so it may not be seen outside of the corresponding viewpoint in both an X and an Y axis, wherein an Z axis is perpendicular to the stereoscopic display device, so that another viewer does not see the pairs of the first and the second stereoscopic images of the 3D virtual object when the another viewer is located above, below, left, or right of the corresponding viewpoint, wherein the 3D virtual object is viewable by a plurality of viewers, as shown by the separate first and the second stereoscopic images received at individual viewer as configured by the at least two layers of blocking electronically configurable liquid crystal material arranged in repeating patterns of closed geometric shapes, wherein a hand, a finger, or a pointer interacts of the 3D virtual object when detected near the physical location of the 3D virtual object as shown by the first and the second stereoscopic images for each viewer such that the first and the second stereoscopic images are updated for each viewer based on the interaction with the 3D virtual object and the angle and distance of the perspective locations of the eyes of the respective viewer.

\* \* \* \* \*